(12) United States Patent
Hiasa et al.

(10) Patent No.: US 9,551,400 B2
(45) Date of Patent: Jan. 24, 2017

(54) POWER TRANSMISSION DEVICE OF HYBRID VEHICLE AND HYBRID SYSTEM

(75) Inventors: Yasuhiro Hiasa, Nagoya (JP); Atsushi Tabata, Okazaki (JP); Tooru Matsubara, Toyota (JP); Tatsuya Imamura, Okazaki (JP); Takeshi Kitahata, Toyota (JP); Kenta Kumazaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 80 days.

(21) Appl. No.: 14/428,078

(22) PCT Filed: Sep. 14, 2012

(86) PCT No.: PCT/JP2012/073723
§ 371 (c)(1),
(2), (4) Date: Mar. 13, 2015

(87) PCT Pub. No.: WO2014/041698
PCT Pub. Date: Mar. 20, 2014

(65) Prior Publication Data
US 2015/0224983 A1   Aug. 13, 2015

(51) Int. Cl.
*B60W 20/00* (2016.01)
*F16H 3/72* (2006.01)
(Continued)

(52) U.S. Cl.
CPC .............. *F16H 3/728* (2013.01); *B60K 6/365* (2013.01); *B60K 6/387* (2013.01); *B60K 6/445* (2013.01);
(Continued)

(58) Field of Classification Search
CPC .......... B60W 20/15; F16H 3/728; B60K 6/54; B60K 6/445; B60K 6/365; Y10S 903/917; Y02T 10/6239
See application file for complete search history.

(56) References Cited

U.S. PATENT DOCUMENTS

| | | | |
|---|---|---|---|
| 7,086,977 B2* | 8/2006 | Supina | B60K 6/40 |
| | | | 475/207 |
| 8,932,178 B2* | 1/2015 | Kato | B60W 10/115 |
| | | | 477/107 |

(Continued)

FOREIGN PATENT DOCUMENTS

| | | | |
|---|---|---|---|
| JP | 2000-346187 | * | 12/2000 |
| JP | 2000 346187 | | 12/2000 |

(Continued)

OTHER PUBLICATIONS

International Search Report Issued Oct. 9, 2012 in PCT/JP12/073723 Filed Sep. 14, 2012.

*Primary Examiner* — Sherry Estremsky
(74) *Attorney, Agent, or Firm* — Oblon, McClelland, Maier & Neustadt, L.L.P.

(57) ABSTRACT

A power transmission device of a hybrid vehicle includes: a transmission including a planetary mechanism including a plurality of transmission rotational elements, one of the transmission rotational elements being connected to a rotary shaft of an engine; a differential device including a plurality of differential rotational elements including one connected to one of the transmission rotational elements of the transmission, one connected to a rotary shaft of a first rotary machine, and one connected to a rotary shaft of a second rotary machine and a driven wheel; a transmission control device configured to control the transmission; and a control device configured to control the first rotary machine such that pinion differential rotation of the transmission or the differential device is set to be not higher than a predeter- (Continued)

mined value at a time unique motor EV driving is performed only by power of the second rotary machine.

9 Claims, 14 Drawing Sheets

(51) Int. Cl.
    *B60K 6/365*     (2007.10)
    *B60K 6/387*     (2007.10)
    *B60K 6/445*     (2007.10)
    *B60K 6/54*     (2007.10)
    *B60K 6/38*     (2007.10)

(52) U.S. Cl.
    CPC ............... *B60K 6/54* (2013.01); *B60W 20/15* (2016.01); *B60K 2006/381* (2013.01); *F16H 2200/2007* (2013.01); *F16H 2200/2035* (2013.01); *Y02T 10/6239* (2013.01); *Y10S 903/917* (2013.01)

(56) References Cited

U.S. PATENT DOCUMENTS

| 8,961,343 B2* | 2/2015 | Tamai | B60K 6/365 475/311 |
| 9,216,641 B2* | 12/2015 | Ono | B60K 6/365 |
| 9,221,327 B2* | 12/2015 | Ono | B60K 6/365 |
| 2015/0087474 A1* | 3/2015 | Matsubara | B60W 20/108 477/3 |
| 2015/0151627 A1* | 6/2015 | Kato | B60K 6/365 475/5 |
| 2015/0183422 A1* | 7/2015 | Imamura | B60K 6/445 477/3 |
| 2015/0183423 A1* | 7/2015 | Yamamoto | B60K 6/387 477/3 |
| 2015/0298685 A1* | 10/2015 | Ono | B60K 6/445 701/22 |
| 2015/0322872 A1* | 11/2015 | Matsubara | B60K 6/445 701/22 |
| 2015/0367829 A1* | 12/2015 | Kodama | B60W 20/15 701/22 |

FOREIGN PATENT DOCUMENTS

| JP | 2006-335127 | * 12/2006 |
| JP | 2009 190694 | 8/2008 |
| JP | 2008-265652 | * 11/2008 |
| JP | 2008 265652 | 11/2008 |

* cited by examiner

FIG.3

| | | | CL1 | BK1 | MG1 | MG2 |
|---|---|---|---|---|---|---|
| EV | FORWARD MOVEMENT/ REARWARD MOVEMENT | UNIQUE MOTOR | ENGINE BRAKING IS NOT REQUIRED | | | G | M |
| | | | ENGINE BRAKING IS USED TOGETHER | △ | △ | G | M |
| | | BOTH MOTOR | | O | O | M | M |
| HV | FORWARD MOVEMENT | HIGH | | | O | G | M |
| | | LOW | | O | | G | M |
| | REARWARD MOVEMENT | LOW | | O | | G | M |

FIG.14

| | | | CL1 | BK1 | MG1 | MG2 |
|---|---|---|---|---|---|---|
| EV | FORWARD MOVEMENT/ REARWARD MOVEMENT | ENGINE BRAKING IS NOT REQUIRED | | | G | M |
| | | ENGINE BRAKING IS USED TOGETHER | △ | △ | G | M |
| | UNIQUE MOTOR | BOTH MOTOR | △ | △ | M | M |
| HV | FORWARD MOVEMENT | HIGH | | ○ | G | M |
| | | LOW | ○ | | G | M |
| | REARWARD MOVEMENT | LOW | ○ | | G | M |

POWER TRANSMISSION DEVICE OF HYBRID VEHICLE AND HYBRID SYSTEM

FIELD

The present invention relates to a power transmission device of a hybrid vehicle which uses an engine and a rotary machine as power sources and a hybrid system.

BACKGROUND

This type of hybrid system provided with an engine, two rotary machines, and a power distribution mechanism (planetary gear mechanism) is conventionally known. In the hybrid system, a rotary shaft of the engine, a rotary shaft of a first rotary machine, a rotary shaft of a second rotary machine, and a driven wheel are connected to respective rotational elements of the power distribution mechanism. Following Patent Literature 1 discloses a hybrid system in which a differential device formed of a pair of first and second planetary gear mechanisms, a clutch, and two brakes are interposed between the rotary shaft of the engine and the rotational element of the power distribution mechanism. The differential device is used as a transmission which changes a speed of rotation of the engine. One engaging unit of the clutch is connected to the rotary shaft of the engine and a carrier of the first planetary gear mechanism and the other engaging unit is connected to a ring gear of the first planetary gear mechanism. The carrier and a sun gear of the first planetary gear mechanism are connected to a sun gear and a ring gear of the second planetary gear mechanism, respectively. The sun gear of the first planetary gear mechanism and the ring gear of the second planetary gear mechanism are connected to a carrier of the power distribution mechanism. A first brake may stop rotation of the ring gear of the first planetary gear mechanism and the other engaging unit of the clutch. A second brake may stop rotation of a carrier of the second planetary gear mechanism. In the hybrid system, engaging the clutch and disengaging each brake make an underdrive mode (UD mode) at the time of middle load and high load, disengaging the clutch and the second brake and engaging the first brake make an overdrive mode (OD mode) at the time of light load, and disengaging the clutch and the first brake and engaging the second brake make a rearward movement mode.

CITATION LIST

Patent Literature

Patent Literature 1: Japanese Patent Application Laid-open No. 2009-190694

SUMMARY

Technical Problem

Although the engine and the second rotary machine are used as the power sources in the conventional hybrid system, an output of the first rotary machine is not transmitted to the driven wheel. That is to say, the hybrid system does not suggest driving as an electric vehicle (EV) using the two rotary machines as the power sources. Therefore, the hybrid system does not have a configuration suitable for using the engine and the two rotary machines as the power sources. Therefore, although it is desirable to form such hybrid system capable of performing EV driving by the two rotary machines of the planetary gear mechanism and the like, differential rotation of a pinion of the planetary gear mechanism might increase at a high vehicle speed depending on a configuration thereof.

Therefore, an object of the present invention is to improve disadvantages of such conventional example and to provide the power transmission device of the hybrid vehicle and the hybrid system which inhibit excessive differential rotation of the pinion.

Solution to Problem

To achieve the above-described object, a power transmission device of a hybrid vehicle according to the present invention includes: a transmission including a planetary mechanism including a plurality of transmission rotational elements configured to perform differential rotation, one of the transmission rotational elements being connected to a rotary shaft of an engine; a differential device including a plurality of differential rotational elements configured to perform differential rotation, the differential rotational elements including: a differential rotational element connected to one of the transmission rotational elements of the transmission; a differential rotational element connected to a rotary shaft of a first rotary machine; and a differential rotational element connected to a rotary shaft of a second rotary machine and a driven wheel; a transmission control device configured to control the transmission into a neutral state in which power is not able to be transmitted between an input and an output of the transmission or into a state in which the power is able to be transmitted between the input and the output; and a control device configured to control the first rotary machine such that pinion differential rotation of the transmission or the differential device is set to be not higher than a predetermined value at a time unique motor EV driving is performed only by power of the second rotary machine.

Moreover, to achieve the above-described object, a power transmission device of a hybrid vehicle according to the present invention includes: a differential device including a plurality of differential rotational elements configured to perform differential rotation including: a differential rotational element connected to a rotary shaft of an engine; and a differential rotational element connected to a rotary shaft of a first rotary machine; a transmission including a plurality of transmission rotational elements configured to perform differential rotation, the transmission rotational elements including: a transmission rotational element connected to one of the differential rotational elements in the differential device; and a transmission rotational element to which a rotary shaft of a second rotary machine and a driven wheel are connected; a transmission control device configured to control the transmission into a neutral state in which power is not able to be transmitted between an input and an output of the transmission or into a state in which the power is able to be transmitted between the input and the output; and a control device configured to control the first rotary machine such that pinion differential rotation of the transmission or the differential device is set to be not higher than a predetermined value at a time unique motor EV driving is performed only by power of the second rotary machine.

Moreover, to achieve the above-described object, a hybrid system according to the present invention includes: an engine; a first rotary machine; a second rotary machine; a transmission including a planetary mechanism including a plurality of transmission rotational elements configured to perform differential rotation with a rotary shaft of the engine connected to one of the transmission rotational elements; a differential device including a plurality of differential rotational elements configured to perform differential rotation, the differential rotational elements including: a differential rotational element connected to one of the transmission rotational elements of the transmission; a differential rotational element connected to a rotary shaft of the first rotary machine; and a differential rotational element connected to a rotary shaft of the second rotary machine and a driven wheel; a transmission control device configured to control the transmission into a neutral state in which power is not able to be transmitted between an input and an output of the transmission or into a state in which the power is able to be transmitted between the input and the output; and a control device configured to control the first rotary machine such that pinion differential rotation of the transmission or the differential device is set to be not higher than a predetermined value at a time unique motor EV driving is performed only by power of the second rotary machine.

It is preferable that the control device increases an absolute value of a rotation rate of the first rotary machine at a time the transmission is in the neutral state.

Moreover, it is preferable that the control device executes the control of the first rotary machine at a time a vehicle speed becomes higher than a predetermined vehicle speed during the unique motor EV driving.

Moreover, it is preferable that the control device controls the transmission control device such that the transmission is put into the state capable of transmitting the power at a time the vehicle speed becomes further higher than the predetermined vehicle speed.

On the other hand, it is preferable that the control device decrease an absolute value of a rotation rate of the first rotary machine at a time a vehicle speed becomes higher than a predetermined vehicle speed during the unique motor EV driving or during both motor EV driving by power of the first rotary machine and the power of the second rotary machine.

Moreover, it is preferable that the control device executes the control of the first rotary machine after switching to the unique motor EV driving at a time the vehicle speed becomes higher than the predetermined vehicle speed during the both motor EV driving.

Advantageous Effects of Invention

The power transmission device of the hybrid vehicle and the hybrid system according to the present invention control the first rotary machine during the unique motor EV driving. The power transmission device and the like may inhibit increase in pinion differential rotation (pinion gear differential rotation rate) of the transmission by increasing the absolute value of the rotation rate of the first rotary machine, for example. The power transmission device and the like may inhibit increase in pinion differential rotation (pinion gear differential rotation rate) of the differential device by decreasing the absolute value of the rotation rate of the first rotary machine, for example. Therefore, according to the power transmission device and the like, deterioration in durability of the transmission and the differential device may be inhibited.

BRIEF DESCRIPTION OF DRAWINGS

FIG. 3 is a view illustrating an operation engagement table of the power transmission device of the hybrid vehicle and the hybrid system of the embodiment.

FIG. 14 is a view illustrating an operation engagement table of the power transmission device of the hybrid vehicle and the hybrid system of the first variation.

DESCRIPTION OF EMBODIMENTS

An embodiment of a power transmission device of a hybrid vehicle and a hybrid system according to the present invention are hereinafter described in detail with reference to the drawings. Meanwhile, the present invention is not limited by the embodiment.

Embodiment

An embodiment of a power transmission device of a hybrid vehicle and a hybrid system according to the present invention is described with reference to FIGS. 1 to 17.

Figure 1:
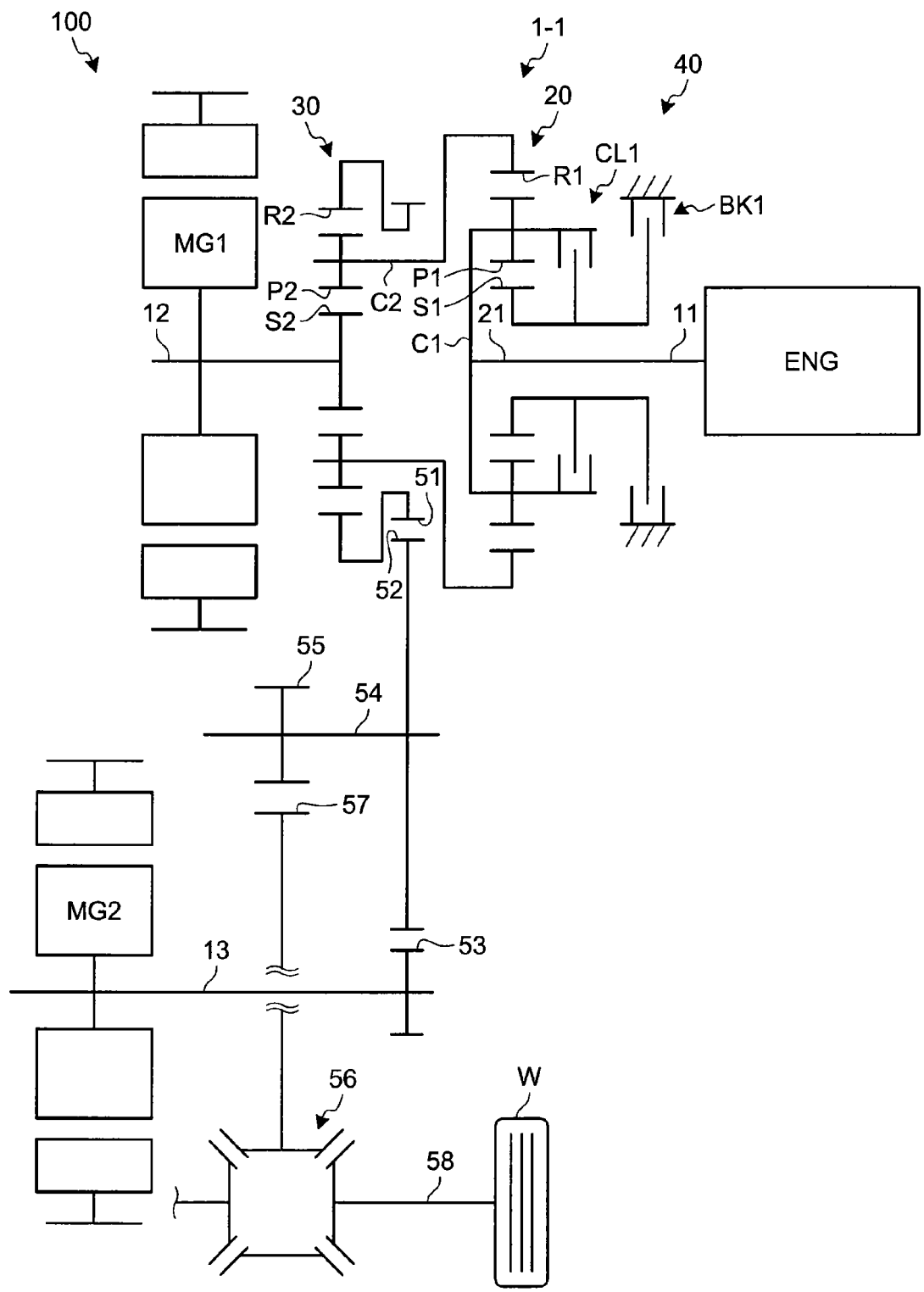
FIG. 1 is a skeleton diagram illustrating a configuration of a power transmission device of a hybrid vehicle and a hybrid system according to the present invention.

Reference numeral 1-1 in FIG. 1 represents the hybrid system of this embodiment. Reference numeral 100 in FIG. 1 represents the hybrid vehicle on which the hybrid system 1-1 is mounted.

The hybrid system 1-1 is provided with an engine ENG, a first rotary machine MG1, and a second rotary machine MG2 as power sources.

The engine ENG is an engine such as an internal-combustion engine and an external-combustion engine which outputs mechanical power (engine torque) from an engine rotary shaft (crankshaft) 11. Operation of the engine ENG is controlled by an electronic control device as an engine control device (hereinafter, referred to as "engine ECU") 91 illustrated in FIG. 2. The engine ECU 91 controls output torque of the engine ENG (hereinafter, referred to as "engine torque") by controlling an opening of an electronic throttle valve, controlling ignition by outputting an ignition signal, and controlling injection of fuel, for example.

The first and second rotary machines MG1 and MG2 are motor generators having function as a motor at the time of power running driving and function as a generator at the time of regeneration driving. Operation of the first and second rotary machines MG1 and MG2 is controlled by an electronic control device as a rotary machine control device (hereinafter, referred to as "MGECU") 92 illustrated in FIG. 2. The first and second rotary machines MG1 and MG2 connected to a secondary battery (not illustrated) though an inverter (not illustrated) may convert mechanical energy (rotary torque) input to rotary shafts thereof (MG1 rotary shaft 12 and MG2 rotary shaft 13) to electric energy to accumulate in the secondary battery. The first and second rotary machines MG1 and MG2 may also convert the electric energy supplied from the secondary battery or the electric energy generated by the other rotary machine (second and first rotary machines MG2 and MG1) to the mechanical energy (rotary torque) to output as mechanical power (output torque) from the rotary shafts thereof (MG1 rotary shaft 12 and MG2 rotary shaft 13), respectively. The MGECU 92 adjusts a current value supplied to the first and second rotary machines MG1 and MG2 to control the output torque of the first rotary machine MG1 (hereinafter, referred to as "MG1 torque") and the output torque of the second rotary machine MG2 (hereinafter, referred to as "MG2 torque"), for example. Meanwhile, herein, a change in rotation rate in a positive rotational direction of the first and second rotary machines MG1 and MG2 is referred to as increase in the rotation rate and a change in the rotation rate in a negative rotational direction is referred to as decrease in the rotation rate.

Furthermore, the hybrid system 1-1 is provided with the power transmission device capable of transmitting power among the power sources and between each of the power sources and a driven wheel W. The power transmission device is provided with a transmission 20 and a differential device 30 connected in series. The illustrated hybrid system 1-1 is a double-axis system in which the engine rotary shaft 11 and the MG1 rotary shaft 12 are concentrically arranged and the MG2 rotary shaft 13 is arranged in parallel to them with an interval therefrom. In the hybrid system 1-1, the transmission 20 is arranged on a side of the engine ENG and the differential device 30 is arranged on a side of the first rotary machine MG1.

The transmission 20 may change a speed of rotation input from the engine ENG to transmit to the differential device 30 or change a speed of rotation input from the differential device 30 to transmit to the engine ENG. The transmission 20 includes a first power transmission element connected to the engine ENG which transmits the power to/from the engine ENG. The first power transmission element is intended to mean a rotary shaft (first rotary shaft) connected to a side of the engine rotary shaft 11 or a transmission rotational element to be described later. When the first power transmission element serves as an input side of the power, the transmission 20 includes a second power transmission element which outputs input power. In the hybrid system 1-1, the second power transmission element is connected to the differential device 30 to transmit the power to/from the differential device 30. Therefore, the second power transmission element of the illustrated transmission 20 is intended to mean a rotary shaft (second rotary shaft) connected to the differential device 30 or a transmission rotational element to be described later. The first and second power transmission elements serve as input/output elements of the transmission 20, respectively.

The transmission 20 herein illustrated is provided with a planetary mechanism formed of a plurality of rotational elements capable of performing differential rotation (hereinafter, referred to as "transmission rotational elements"). A single-pinion planetary gear mechanism, a double-pinion planetary gear mechanism, a Ravigneaux planetary gear mechanism and the like may be applied to the planetary mechanism. The illustrated transmission 20 being a differential device provided with one single-pinion planetary gear mechanism includes a sun gear S1, a ring gear R1, a plurality of pinion gears P1, and a carrier C1 as the transmission rotational elements. In the transmission 20, one of the sun gear S1, the ring gear R1, and the carrier C1 is connected to the engine ENG and another one is connected to the differential device 30. In this illustration, the engine ENG is coupled with the carrier C1. The carrier C1 is coupled with the engine rotary shaft 11 through a rotary shaft (first rotary shaft) 21 so as to be able to rotate integrally with the engine rotary shaft 11. Therefore, in this illustration, the carrier C1 or the rotary shaft 21 serves as the first power transmission element. In this illustration, the differential device 30 is coupled with the ring gear R1. The ring gear R1 being the above-described second power transmission element is connected to one of differential rotational elements of the differential device 30 (herein, carrier C2 as described later) such that this may rotate integrally with the same.

The hybrid system 1-1 is provided with a transmission control device 40 which changes a gear ratio or a gear position of the transmission 20. The transmission 20 herein illustrated has high and low two gear positions and the transmission control device 40 switches the gear position between a high speed side and a low speed side or switches into a neutral state. Therefore, the transmission control device 40 may control the transmission 20 into the neutral state in which the power cannot be transmitted between the input and output of the torque in the transmission 20 or a state in which the power may be transmitted between the input and output. Specifically, the transmission control device 40 is provided with two engagement devices which adjust a rotating state and a stopping state of a predetermined transmission rotational element in the transmission 20. In this illustration, a clutch CL1 and a brake BK1 are provided as the engagement devices. Engaging operation and disengaging operation of the clutch CL1 and the brake BK1 are controlled by a HVECU 90 to be described later.

The clutch CL1 is a clutch device which couples/disconnects the sun gear S1 with/from the carrier C1. The clutch CL1 may be formed as a frictionally engaging so-called frictional clutch device or a meshing clutch device, for example. The clutch CL1 the engaging operation or disengaging operation of which is performed by hydraulic driving or electrically includes a first engaging member rotating integrally with the sun gear S1 and a second engaging member rotating integrally with the carrier C1. The clutch CL1 herein illustrated is operated by a supply hydraulic pressure adjusted by a hydraulic pressure adjustment device (not illustrated).

The clutch CL1 couples the sun gear S1 with the carrier C1 by controlling the first and second engaging members in an engaged state. The clutch CL1 in a semi-engaged state allows relative rotation between the sun gear S1 and the carrier C1 within a range in which the first and second engaging members do not rotate integrally with each other while allowing them to slide upon each other. The clutch CL1 in a fully-engaged state integrates the sun gear S1 with the carrier C1 to disable the relative rotation therebetween. Therefore, the clutch CL1 controlled in the fully-engaged state may prohibit differential operation of the planetary gear mechanism in the transmission 20. On the other hand, the clutch CL1 disconnects the sun gear S1 from the carrier C1 by controlling the first and second engaging members in a disengaged state, thereby allowing the relative rotation therebetween. Therefore, the clutch CL1 controlled in the disengaged state may allow the differential rotation among the transmission rotational elements in the transmission 20.

The brake BK1 is a brake device which regulates the rotation of the sun gear S1. The brake BK1 may be formed as a frictional engaging type or a meshing type as is the case with the clutch CL1. The brake BK1 the engaging operation or disengaging operation of which is performed by hydraulic driving or electrically includes a first engaging member rotating integrally with the sun gear S1 and a second engaging member fixed to a vehicle body side (for example, a case of the power transmission device and the like). The brake BK1 herein illustrated is operated by the supply hydraulic pressure adjusted by the hydraulic pressure adjustment device (not illustrated).

The brake BK1 regulates the rotation of the sun gear S1 by coupling the sun gear S1 with the vehicle body side by controlling the first and second engaging members in an engaged state. The brake BK1 in a semi-engaged state regulates the rotation of the sun gear S1 within a range in which this does not stop while allowing the first engaging member to slide upon the second engaging member. The brake BK1 in a fully-engaged state prohibits the rotation of the sun gear S1. On the other hand, the brake BK1 disconnects the sun gear S1 from the vehicle body side by controlling the first and second engaging members in a disengaged state, thereby allowing the rotation of the sun gear S1.

The transmission 20 is put into the neutral state when both the clutch CL1 and the brake BK1 are in the disengaged state. The neutral state is intended to mean a state in which the power cannot be transmitted between the first rotary shaft 21 and the second rotary shaft (that is to say, between the carrier C1 and the ring gear R1) being the input and output of the transmission 20 in this illustration. In the neutral state, the engine ENG is disconnected from the differential device 30 and the power transmission therebetween is shut down.

On the other hand, in the transmission 20, engaging any one of the clutch CL1 and the brake BK1 makes a connected state in which the power may be transmitted between the carrier C1 and the ring gear R1 (between the engine ENG and the differential device 30). Therefore, when any one of the clutch CL1 and the brake BK1 is engaged, the power may be transmitted between the engine ENG and the driven wheel W, so that it becomes possible to drive by using the power of the engine ENG and generate engine braking.

For example, when the clutch CL1 is disengaged and the brake BK1 is engaged, the transmission 20 performs the differential rotation in a state in which the sun gear S1 is fixed (rotation of which is stopped). At that time, the transmission 20 accelerates the rotation of the engine ENG input to the carrier C1 to output from the ring gear R1. That is to say, the transmission 20 is put into an overdrive (OD) state in which the gear ratio is smaller than one by the disengagement of the clutch CL1 and the engagement of the brake BK1.

On the other hand, when the clutch CL1 is engaged and the brake BK1 is disengaged, the transmission 20 is put into a state in which the differential rotation is prohibited in which all the transmission rotational elements integrally rotate and the input and output (carrier C1 and ring gear R1) are directly connected to each other. At that time, the transmission 20 in which the gear ratio is set to one outputs the rotation of the engine ENG input to the carrier C1 from the ring gear R1 at the same speed without accelerating or decelerating the same.

In this manner, in the transmission 20, the gear position on the high speed side (high speed position) is formed by the disengagement of the clutch CL1 and the engagement of the brake BK1 and the gear position on the low speed side (low speed position) is formed by the engagement of the clutch CL1 and the disengagement of the brake BK1. In the hybrid system 1-1, the gear ratio of the transmission 20 is not larger than one, so that it is not necessarily required to make the torque of the first rotary machine MG1 high.

The differential device 30 includes a plurality of rotational elements capable of performing the differential rotation (hereinafter, referred to as "differential rotational elements") and is provided with a planetary mechanism formed of the differential rotational elements. A single-pinion planetary gear mechanism, a double-pinion planetary gear mechanism, a Ravigneaux planetary gear mechanism and the like may be applied to the planetary mechanism. The illustrated differential device 30 provided with one single-pinion planetary gear mechanism includes a sun gear S2, a ring gear R2, a plurality of pinion gears P2, and a carrier C2 as the differential rotational elements. In the differential device 30, one of the sun gear S2, the ring gear R2, and the carrier C2 is connected to the engine ENG through the transmission 20, another one is connected to the first rotary machine MG1, and the other one is connected to the second rotary machine MG2 and the driven wheel W. In this illustration, the ring gear R1 of the transmission 20 is coupled to the carrier C2, the first rotary machine MG1 is coupled to the sun gear S2, and the second rotary machine MG2 and the driven wheel W are coupled to the ring gear R2. Herein, the carrier C2 being the differential rotational element coupled to the ring gear R1 so as to be able to rotate integrally with the ring gear R1 of the transmission 20 serves as the power transmission element to/from the transmission 20. The sun gear S2 being the differential rotational element coupled to the MG1 rotary shaft 12 so as to be able to rotate integrally with the same serves as the power transmission element to/from the first rotary machine MG1. The ring gear R2 being the differential rotational element coupled to the second rotary machine MG2 and the driven wheel W through a gear group and the like to be described later serves as the power transmission element to/from the second rotary machine MG2 and the driven wheel W.

To the ring gear R2 of the differential device 30, a concentrically arranged counter drive gear 51 capable of integrally rotating with the same is connected. The counter drive gear 51 is in a state meshing with a counter driven gear 52 having a rotational axis arranged so as to be displaced in parallel. The counter driven gear 52 is in a state meshing with a reduction gear 53 having a rotational axis arranged so as to be displaced in parallel. The reduction gear 53 is fixed on an axis of the MG2 rotary shaft 13. Therefore, the power is transmitted between the counter driven gear 52 and the second rotary machine MG2 through the reduction gear 53. For example, the reduction gear 53 having a smaller diameter than that of the counter driven gear 52 decelerates the rotation of the second rotary machine MG2 to transmit to the counter driven gear 52.

The counter driven gear 52 is fixed on an axis of a counter shaft 54. Herein, the illustrated hybrid vehicle 100 is supposed to be a front engine front drive (FF) vehicle, a rear engine rear drive (RR) vehicle, or a four-wheel drive vehicle based on the FF vehicle or the RR vehicle. Therefore, a drive pinion gear 55 is fixed on the axis of the counter shaft 54. The counter driven gear 52 and the drive pinion gear 55 may integrally rotate with each other through the counter shaft 54. The drive pinion gear 55 is in a state meshing with a differential ring gear 57 of a differential device 56. The differential device 56 is coupled with the driven wheels W through right and left drive shafts 58. For example, arranging the drive pinion gear 55 and the differential ring gear 57 (that is to say, differential device 56) between the second rotary machine MG2 and the reduction gear 53 may realize a compact hybrid system 1-1.

In the power transmission device of the hybrid system 1-1, an entire gear ratio (so to speak, system gear ratio of the hybrid system 1-1) is determined from the gear ratio of the transmission 20 and the gear ratio of the differential device 30. The system gear ratio is intended to mean a ratio between the input and output in one power transmission device formed of the transmission 20 and the differential device 30 and indicates a ratio of the rotation rate on the input side to the rotation rate on the output side of the power transmission device (deceleration ratio). In this illustration, the ratio of the rotation rate of the carrier C1 of the transmission 20 to the rotation rate of the ring gear R2 of the differential device 30 is the system gear ratio. Therefore, in this power transmission device, a range of the gear ratio becomes wider than that when only the differential device 30 serves as the transmission.

Figure 2:
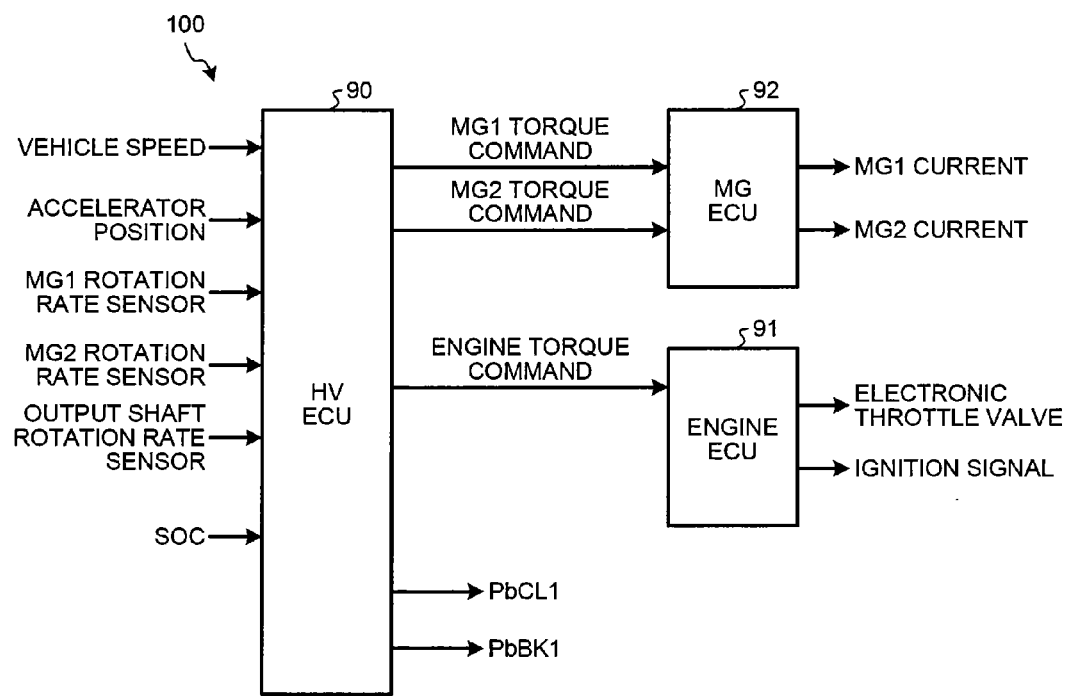
FIG. 2 is an input-output relation diagram of an embodiment.

In the hybrid system 1-1, an integrated ECU (hereinafter, referred to as "HVECU") 90 which generally controls the engine ECU 91 and the MGECU 92 and performs integrated control of the system is provided as illustrated in FIG. 2, and they form a control device of this system.

Various sensors such as a vehicle speed sensor, an accelerator position sensor, an MG1 rotation rate sensor, an MG2 rotation rate sensor, an output shaft rotation rate sensor, and a battery sensor are connected to the HVECU 90. The HVECU 90 obtains a vehicle speed, an acceleration position, the rotation rate of the first rotary machine MG1 (MG1 rotation rate), the rotation rate of the second rotary machine MG2 (MG2 rotation rate), the rotation rate of an output shaft of the power transmission device (for example, the rotary shaft of the ring gear R2 of the differential device 30), a state of charge (SOC) of the secondary battery and the like by the various sensors.

The HVECU 90 calculates required driving force, required power, required torque and the like to the hybrid vehicle 100 based on the obtained information. The HVECU 90 calculates required engine torque, required MG1 torque, and required MG2 torque based on the calculated required vehicle driving force, for example. The HVECU 90 transmits the required engine torque to the engine ECU 91 and allows the engine ENG to output the same and transmits the required MG1 torque and the required MG2 torque to the MGECU 92 and allows the first and second rotary machines MG1 and MG2 to output the same.

The HVECU 90 controls the clutch CL1 and the brake BK1 based on a driving mode and the like to be described later. At that time, the HVECU 90 outputs a command value of the supply hydraulic pressure to the clutch CL1 (PbCL1) and a command value of the supply hydraulic pressure to the brake BK1 (PbBK1) to the hydraulic pressure adjustment device. The hydraulic pressure adjustment device controls the supply hydraulic pressures according to the command values PbCL1 and PbBK1 and allows the clutch CL1 and the brake BK1 to perform the engaging operation or the disengaging operation.

In the hybrid system 1-1, an electric vehicle (EV) driving mode and a hybrid vehicle (HV) driving mode are set and it is possible to drive the hybrid vehicle 100 in any of the driving modes.

The EV driving mode is a driving mode in which the power of at least one of the first and second rotary machines MG1 and MG2 is transmitted to the driven wheel W. The HV driving mode is a driving mode in which the driving to transmit only the power of the engine ENG to the driven wheel W and the driving to transmit the power of the second rotary machine MG2 in addition to the power of the engine ENG to the driven wheel W may be performed.

FIG. 3 illustrates an operation engagement table of the hybrid system 1-1 for each driving mode. In fields of the clutch CL1 and the brake BK1 in the operation engagement table, a circle mark represents the engaged state and a blank field represents the disengaged state. A triangle mark represents that the brake BK1 is in the disengaged state when the clutch CL1 is in the engaged state and that the brake BK1 is in the engaged state when the clutch CL1 is in the disengaged state. In fields of the first rotary machine MG1 and the second rotary machine MG2 in the operation engagement table, "G" represents that the rotary machine mainly operates as the generator and "M" represents that this mainly operates as the motor.

[EV Driving Mode]

The EV driving mode includes a unique motor EV mode in which only the second rotary machine MG2 is used as the power source and a both motor EV mode in which both the first and second rotary machines MG1 and MG2 are used as the power sources. In the hybrid system 1-1, for example, the unique motor EV mode is selected at the time of low load operation and the both motor EV mode is selected when higher load operation is required.

[Unique Motor EV Mode]

Figure 4:
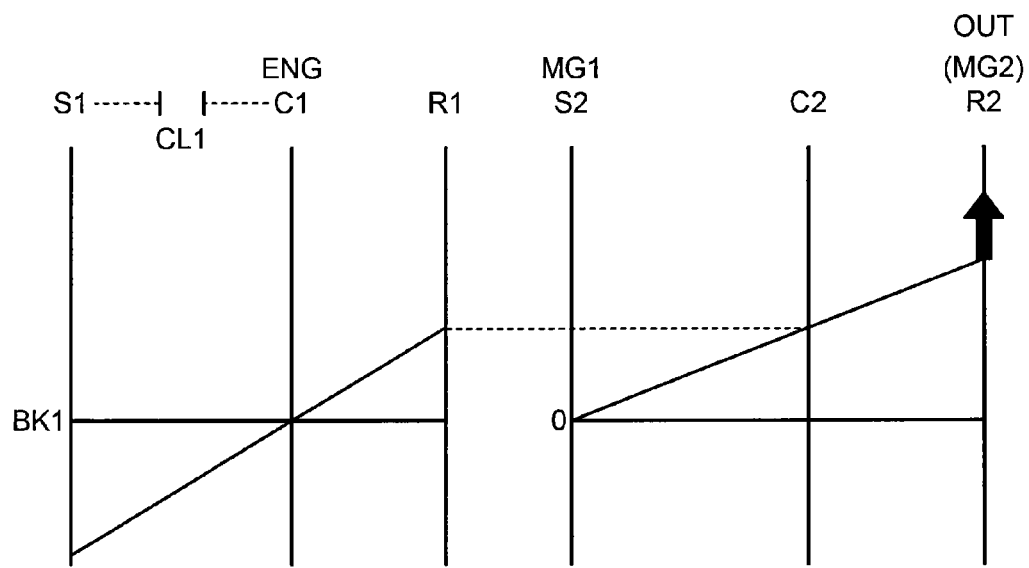
FIG. 4 is an alignment chart according to a unique motor EV mode.

In the unique motor EV mode, when the secondary battery may be charged based on the SOC, the HVECU 90 does not necessarily require electricity consumption by the engine braking, so that this disengages both the clutch CL1 and the brake BK1. According to this, the planetary gear mechanism of the transmission 20 is put into the neutral state and the transmission rotational elements may perform the differential rotation. In this case, the HVECU 90 allows the MGECU 92 to allow the second rotary machine MG2 to output positive MG2 torque according to the required vehicle driving force in positive rotation, thereby generating vehicle driving force in a forward movement direction on the hybrid vehicle 100. The positive rotation is the rotation in the direction of the rotation of the MG2 rotary shaft 13 and the ring gear R2 of the differential device 30 at the time of the forward movement. FIG. 4 illustrates an alignment chart at the time of the forward movement.

Herein, at the time of the forward movement in the unique motor EV mode (engine braking is not required), the ring gear R2 positively rotates in conjunction with the rotation of the counter driven gear 52, so that the first rotary machine MG1 might generate a drag loss in association with the differential rotation of the differential device 30. Therefore, the HVECU 90 tries to decrease the drag loss by allowing the first rotary machine MG1 to operate as the generator. Specifically, the HVECU 90 decreases the drag loss of the first rotary machine MG1 by applying slight torque to the first rotary machine MG1 to allow the same to generate power and feedback controlling the MG1 rotation rate to 0. When it is possible to maintain the rotation of the first rotary machine MG1 at 0 without applying the torque to the first rotary machine MG1, it is possible to try to decrease the drag loss of the first rotary machine MG1 without applying the torque to the first rotary machine MG1. In order to decrease the drag loss of the first rotary machine MG1, it is also possible to set the rotation of the first rotary machine MG1 to 0 by utilizing cogging torque or d-axis lock of the first rotary machine MG1. The d-axis lock is intended to mean supplying current which generates a magnetic field to fix a rotator from the inverter to the first rotary machine MG1, thereby controlling the rotation of the first rotary machine MG1 to 0.

At the time of the forward movement, the ring gear R1 of the transmission 20 also positively rotates together with the carrier C2. At that time, the transmission 20 is in the neutral state in which the clutch CL1 and the brake BK1 are disengaged, so that the sun gear S1 negatively runs idle and the carrier C1 stops, and the engine ENG is not dragged with the rotation maintained at 0. Therefore, at the time of the forward movement, a regeneration amount of the first rotary machine MG1 may be made large. At the time of the forward movement, it is possible to drive in a state in which the engine ENG is stopped. At the time of the forward movement, the drag loss in association with the rotation of the engine ENG during the EV driving does not occur, so that fuel consumption (electricity consumption) may be improved.

Meanwhile, at the time of rearward movement, when the secondary battery may be charged, both the clutch CL1 and the brake BK1 are disengaged and the second rotary machine MG2 is allowed to output negative MG2 torque according to the required vehicle driving force in negative rotation, and according to this, driving force in a rearward movement direction is generated on the hybrid vehicle 100. At that time also, the HVECU 90 decreases the drag loss of the first rotary machine MG1 as in the forward movement.

On the other hand, in the unique motor EV mode, when the SOC is larger than a predetermined value and it is prohibited to charge the secondary battery, the engine braking may be used together in the above-described state of driving for discharging the secondary battery. Therefore, in this case, the engine ENG is put into the dragged state by the engagement of only one of the clutch CL1 and the brake BK1 as illustrated in FIG. 3, and the engine braking is generated. At that time, the HVECU 90 increases an engine speed by the control of the first rotary machine MG1.

[Both Motor EV Mode]

Figure 5:
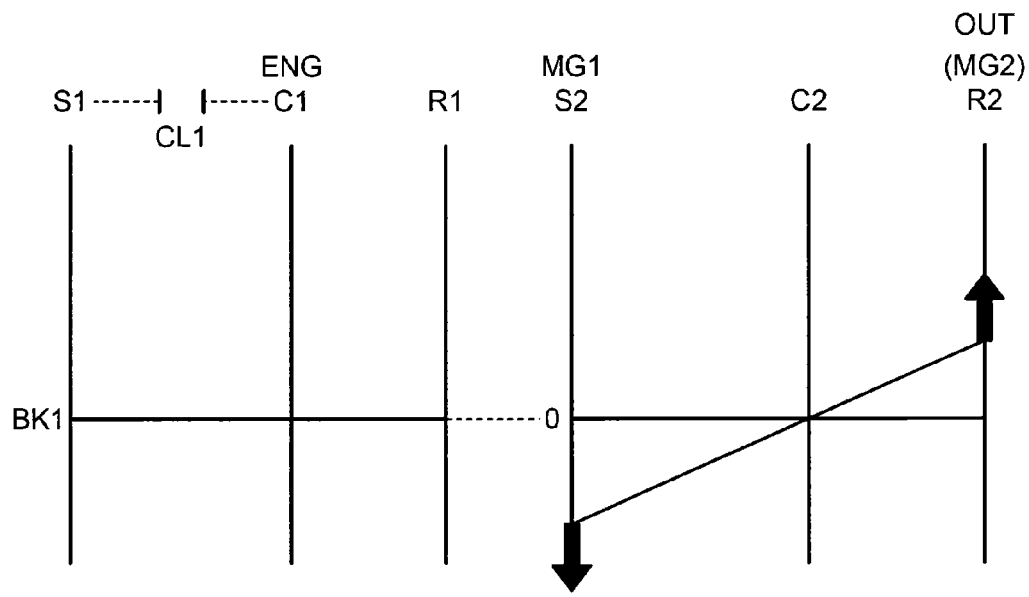
FIG. 5 is an alignment chart according to a both motor EV mode.

In the both motor EV mode, the HVECU 90 engages both the clutch CL1 and the brake BK1. According to this, in the transmission 20, the differential rotation of the planetary gear mechanism is prohibited in association with the engagement of the clutch CL1 and the rotation of the sun gear S1 is prohibited in association with the engagement of the brake BK1, so that all the transmission rotational elements of the planetary gear mechanism stop. Therefore, the speed of the engine ENG reaches 0. Since the ring gear R1 stops, in the differential device 30, the carrier C2 connected to the ring gear R1 also stops and the rotation of the carrier C2 is locked at 0. FIG. 5 illustrates an alignment chart at that time.

The HVECU 90 allows the first and second rotary machines MG1 and MG2 to output the MG1 torque and the MG2 torque according to the required vehicle driving force, respectively. Herein, the carrier C2 at that time, the rotation of which is prohibited, may receive reaction force of the MG1 torque. Therefore, in the differential device 30, the MG1 torque may be output from the ring gear R2. At the time of the forward movement, it is possible to output the torque of the positive rotation from the ring gear R2 by allowing the first rotary machine MG1 to output negative MG1 torque in the negative rotation. On the other hand, at the time of the rearward movement, it is possible to output the torque of the negative rotation from the ring gear R2 by allowing the first rotary machine MG1 to output positive MG1 torque in the positive rotation.

Meanwhile, at the time of the rearward movement, when the secondary battery may be charged, it is also possible to engage both the clutch CL1 and the brake BK1 to fix the carrier C1 of the transmission 20, thereby driving by the power of both the first and second rotary machines MG1 and MG2.

[HV Driving Mode]

Figure 6:
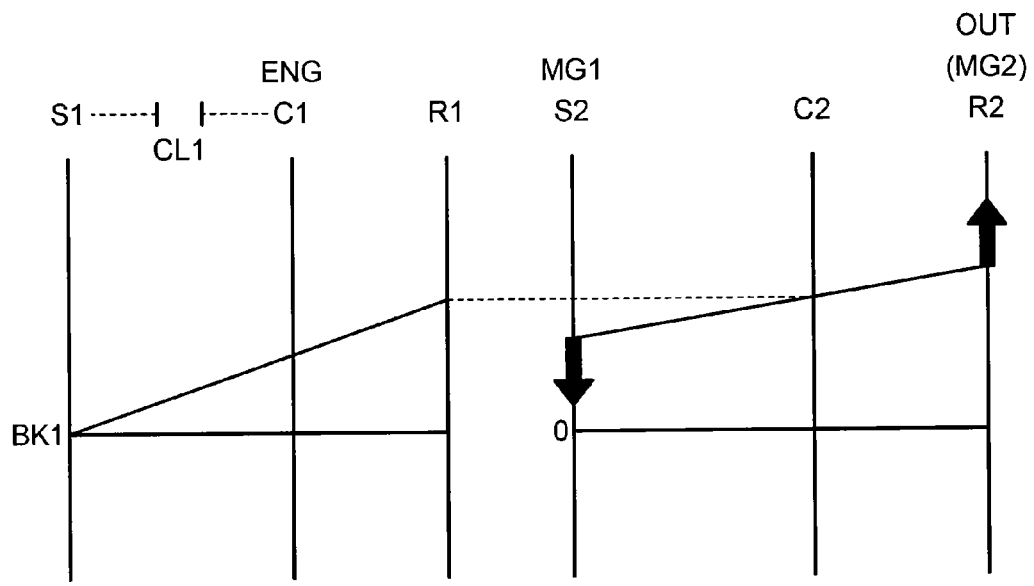
FIG. 6 is an alignment chart according to a HV high mode.
Figure 7:
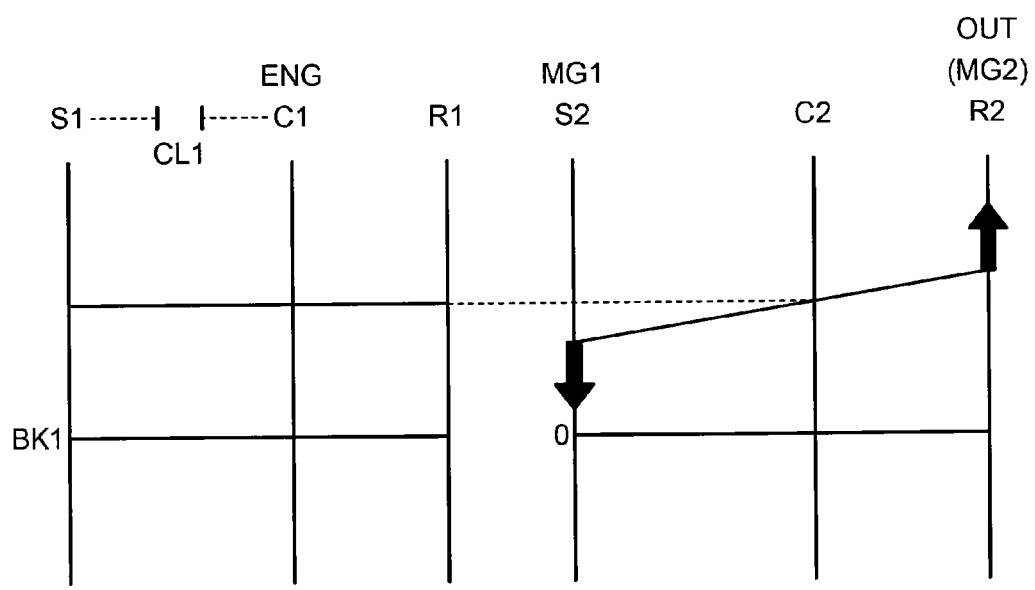
FIG. 7 is an alignment chart according to a HV low mode.

In the HV driving mode, only the engine torque or the engine torque and the MG2 torque are transmitted to the drive shaft 58 for driving while the first rotary machine MG1 receives the reaction force. The engine torque transmitted to the drive shaft 58 at that time, so-called engine directly transmitted torque is mechanically transmitted from the engine ENG to the drive shaft 58 without an electric path. The HV driving mode includes the driving mode in which the transmission 20 is switched to the high speed position (hereinafter, referred to as "HV high mode") and the driving mode in which the transmission 20 is switched to the low speed position (hereinafter, referred to as "HV low mode"). In the illustrated hybrid system 1-1, the HV high mode in which power circulation may be reduced is selected at the time of high vehicle speed driving and the HV low mode is selected at the time of driving at low to middle speed lower than the same. FIG. 6 illustrates an alignment chart in the HV high mode. FIG. 7 illustrates an alignment chart in the HV low mode. In the HV driving mode, the differential device 30 is basically in a state in which this may perform the differential rotation, and the gear position of the transmission 20 is switched by control of the state (engaged state or disengaged state) of the clutch CL1 and the brake BK1.

In the HV high mode, the HVECU 90 disengages the clutch CL1 and engages the brake BK1, thereby switching the transmission 20 to the high speed position and controls such that the rotation of the engine ENG is accelerated to be output. On the other hand, in the HV low mode, the HVECU 90 engages the clutch CL1 and disengages the brake BK1, thereby switching the transmission 20 to the low speed position and controls such that the rotation of the engine ENG is output at the same speed.

At the time of the rearward movement, the HV low mode is used. At the time of the rearward movement, the first rotary machine MG1 and the second rotary machine MG2 are operated as the generator and the motor, respectively, and the second rotary machine MG2 is rotated in the direction opposite to that of the forward movement.

The HVECU 90 executes cooperative transmission control to shift gears of the transmission 20 and the differential device 30 at the same time when switching between the HV high mode and the HV low mode. In the cooperative transmission control, the gear ratio of any one of the transmission 20 and the differential device 30 is increased and that of the other one is decreased.

Specifically, the HVECU 90 changes the gear ratio of the differential device 30 to a high gear side in synchronization with the shift of the transmission 20 to the low speed position such that the system gear ratio in a switching process is maintained constant when switching from the HV high mode to the HV low mode. On the other hand, the HVECU 90 changes the gear ratio of the differential device 30 to a low gear side in synchronization with the shift to the high speed position of the transmission 20 such that the system gear ratio in the switching process is maintained constant when switching from the HV low mode to the HV high mode. In this manner, in the hybrid system 1-1, discontinuous change in the system gear ratio is inhibited or decreased, so that an adjustment amount of the engine speed in association with the gear shift is decreased or the adjustment of the engine speed in association of the gear shift becomes not necessary.

The HVECU 90 continuously changes the system gear ratio to the low gear side by gear ratio control of the differential device 30, for example, after switching to the HV low mode. On the other hand, the HVECU 90 continuously changes the system gear ratio to the high gear side by the gear ratio control of the differential device 30, for example, after switching to the HV high mode. The gear ratio control of the differential device 30 is performed by the control of the rotation rates of the first rotary machine MG1 and the second rotary machine MG2, for example. In the hybrid system 1-1, a transmission system in the entire system is formed of the transmission 20, the differential device 30, the first rotary machine MG1, the clutch CL1, and the brake BK1. Therefore, the configuration may be operated as an electric continuously variable transmission in which the system gear ratio is continuously changed by electrical control of the rotation of the first rotary machine MG1.

Figure 8:
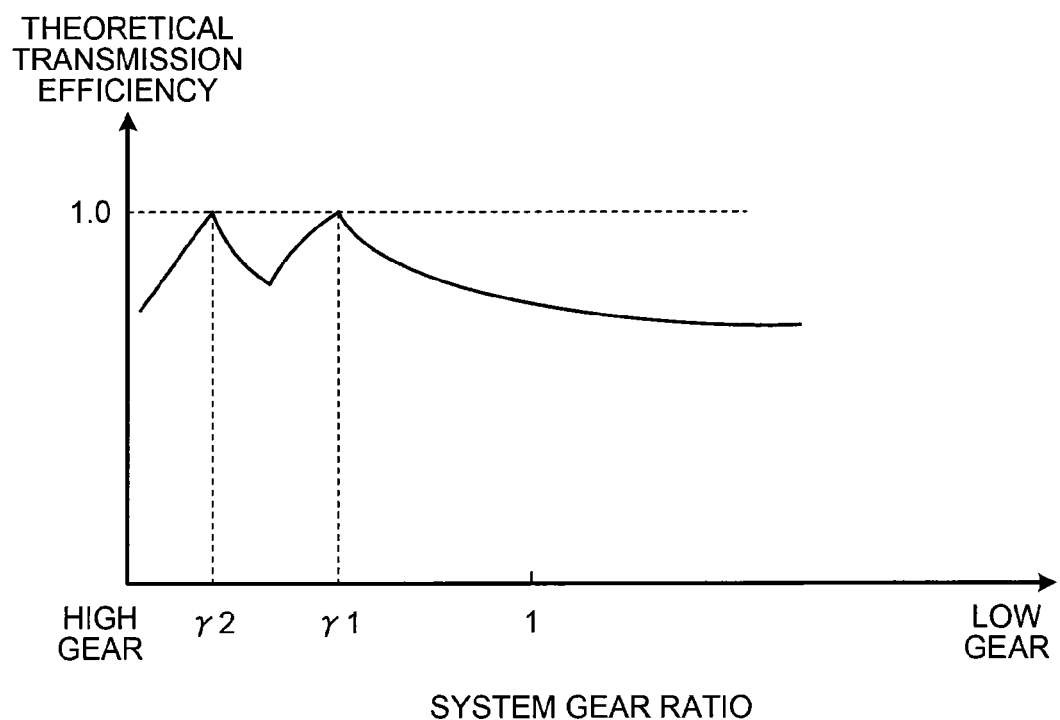
FIG. 8 is a view illustrating a theoretical transmission efficiency line.

FIG. 8 is a view illustrating a theoretical transmission efficiency line in the HV driving mode, the theoretical transmission efficiency line when it is switched between the HV high mode and the HV low mode. In this drawing, the system gear ratio and theoretical transmission efficiency in the HV driving mode are represented along a horizontal axis and a vertical axis, respectively. In the HV driving mode, the theoretical transmission efficiency line is used and the driving mode with higher efficiency out of the HV high mode and the HV low mode is selected at the same gear ratio, for example.

The theoretical transmission efficiency reaches maximum efficiency of 1.0 when the power input to the power transmission device is fully transmitted to the counter drive gear 51 by mechanical transmission without the electric path. The theoretical transmission efficiency in the HV low mode reaches the maximum efficiency of 1.0 at the system gear ratio of $\gamma1$. The gear ratio $\gamma1$ is the system gear ratio on an overdrive side ($\gamma1<1$). The theoretical transmission efficiency in the HV high mode reaches the maximum efficiency of 1.0 at the system gear ratio of $\gamma2$. The gear ratio $\gamma2$ is the gear ratio on a higher gear side than the gear ratio $\gamma1$ ($\gamma2<\gamma1$). When the system gear ratio is the gear ratio $\gamma1$ or the gear ratio $\gamma2$, the rotation rate of the first rotary machine MG1 (sun gear S2) reaches 0. Therefore, when the system gear ratio is the gear ratio $\gamma1$ or the gear ratio $\gamma2$, the electrical path reaches 0 by the first rotary machine MG1 receiving the reaction force and it is possible to transmit the power from the engine ENG to the counter drive gear 51 only by the mechanical power transmission. Hereinafter, the gear ratio $\gamma1$ is also referred to as "first mechanical transmission gear ratio $\gamma1$". The gear ratio $\gamma2$ is also referred to as "second mechanical transmission gear ratio $\gamma2$".

As is clear in FIG. 8, the theoretical transmission efficiency in the HV driving mode decreases as the system gear ratio becomes a value on a lower gear side than the first mechanical transmission gear ratio $\gamma1$. The theoretical transmission efficiency decreases as the system gear ratio becomes a value on a higher gear side than the second mechanical transmission gear ratio $\gamma2$. The theoretical transmission efficiency curves toward a low efficiency side in a region of the gear ratio between the first mechanical transmission gear ratio $\gamma1$ and the second mechanical transmission gear ratio $\gamma2$.

In this manner, the power transmission device of the hybrid system 1-1 has two mechanical points (first mechanical transmission gear ratio $\gamma1$ and second mechanical transmission gear ratio $\gamma2$) on a higher gear side than the system gear ratio of one. Since the power transmission device includes the transmission 20, the clutch CL1, and the brake BK1, this may generate another mechanical point (second mechanical transmission gear ratio $\gamma2$) on the higher gear side than the mechanical point (first mechanical transmission gear ratio $\gamma1$) in a case in which the engine ENG is directly coupled to the carrier C2 of the differential device 30. Therefore, the hybrid system 1-1 may improve the transmission efficiency at the time of operation with the high gear and improve the fuel consumption at the time of the high vehicle speed driving in the HV driving mode.

Figure 9:
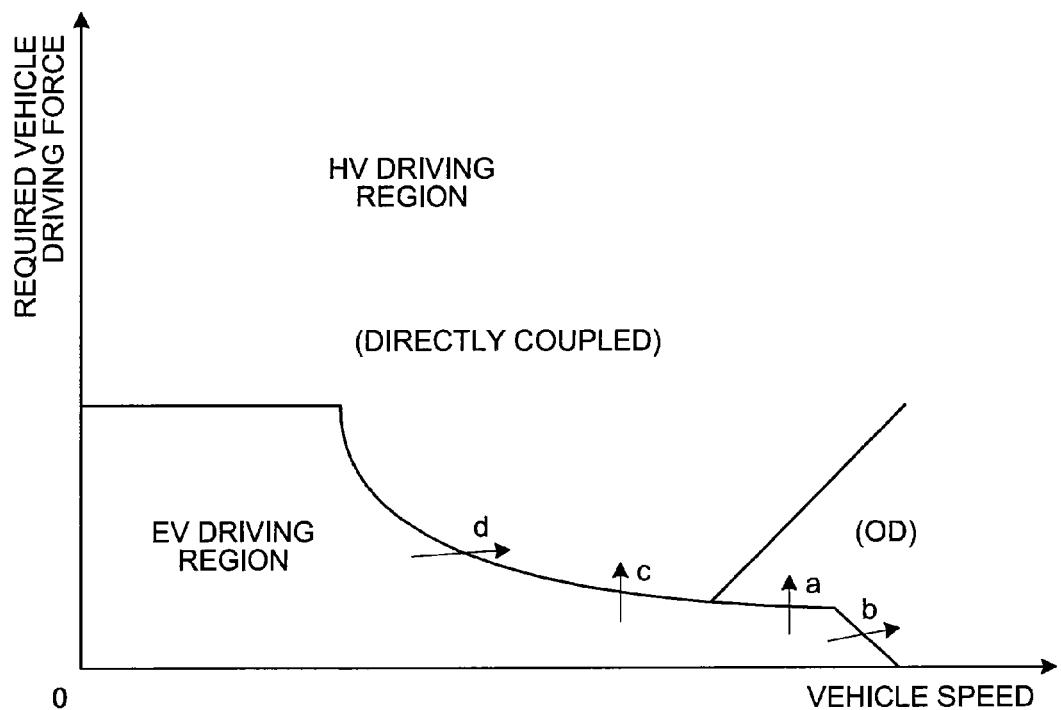
FIG. 9 is a view illustrating an EV driving region and a HV driving region.

Herein, FIG. 9 illustrates an example of correspondence relationship among the vehicle speed, the required vehicle driving force, and the driving mode. The hybrid system 1-1 mainly performs the EV driving when the vehicle speed is low and the required vehicle driving force is of low load as illustrated in FIG. 9. However, as the vehicle speed becomes higher, a region of the EV driving is narrowed to a lower load according to output properties of the first and second rotary machines MG1 and MG2. Alternatively, when the vehicle speed is high and the required vehicle driving force is of low load, the transmission 20 is controlled into the overdrive state (high speed position) by the disengagement of the clutch CL1 and the engagement of the brake BK1, and the fuel consumption is improved in the HV driving. In a remaining region (that is to say, when the required vehicle driving force is of middle load or high load regardless of the vehicle speed and when the required vehicle driving force is of low load at the middle vehicle speed), the transmission 20 is controlled into a directly coupled state (low speed position) by the engagement of the clutch CL1 and the disengagement of the brake BK1 and the HV driving is performed. Meanwhile, even when the vehicle speed is high and the required vehicle driving force is of low load, the transmission 20 is controlled into the directly coupled state as the vehicle speed decreases.

The HVECU 90 starts the stopping engine ENG when it is switched from the EV driving mode to the HV driving mode. For example, the HVECU 90 requires the engine ECU 91 to start the engine ENG when determining that switching from the EV driving mode to the HV driving mode is necessary in association with increase in the required vehicle driving force, increase in the vehicle speed and the like.

In the hybrid system 1-1, when the HV driving mode (HV high mode or HV low mode) after the switching is determined based on the vehicle speed and the required vehicle driving force, a target gear position (target gear ratio) of the transmission 20 after the engine start is completed according to the HV driving mode is determined. When it is switched to the HV high mode, the high speed position (overdrive state) by the disengagement of the clutch CL1 and the engagement of the brake BK1 is required (indicated by arrows a and b in FIG. 9) as the target gear position (target gear ratio) of the transmission 20 after the engine start is completed. When it is switched to the HV low mode, the low speed position (directly coupled state) by the engagement of the clutch CL1 and the disengagement of the brake BK1 is required (indicated by arrows c and d in FIG. 9) as the target gear position (target gear ratio) of the transmission 20 after the engine start is completed.

When the current EV driving is in the unique motor EV mode (engine braking is not required), the transmission 20 is currently in the neural state, so that it is shifted to the target gear position (target gear ratio) according to the HV driving mode after the switching. When the current EV driving is in the unique motor EV mode in which the engine braking is used together, the transmission 20 is currently in the high speed position or the low speed position, so that it is shifted to the target gear position (target gear ratio) when the current gear position is different from the target gear position (target gear ratio) according to the HV driving mode after the switching. When the current EV driving is in the both motor EV mode, the transmission 20 is in a state in which both the clutch CL1 and the brake BK1 are engaged, so that it is shifted to the target gear position (target gear ratio) according to the HV driving mode after the switching.

In the hybrid system 1-1, when the required vehicle driving force becomes larger than predetermined force during the driving in the EV driving mode, the driving mode is switched such that the driving force is sufficient for the required vehicle driving force. For example, when the current driving mode is the unique motor EV mode, it is switched to the both motor EV mode or the HV driving mode when the required vehicle driving force becomes larger than the predetermined force. Meanwhile, the predetermined force at the time of switching to the both motor EV mode is different from that at the time of switching to the HV driving mode.

Herein, during the driving in the unique motor EV mode (hereinafter, referred to as "unique motor EV driving"), the rotation of the second rotary machine MG2 and the driven wheel W is transmitted to the differential device 30 to allow the differential device 30 to perform differential operation. Therefore, during the unique motor EV driving, when the transmission 20 is controlled in the neutral state, the rotation rate of the ring gear R1 of the transmission 20 (rotation rate of the carrier C2 of the differential device 30) increases as the vehicle speed increases in association with the increase in the required vehicle driving force and pinion differential rotation of the transmission 20 increases in association with this. Herein, the pinion differential rotation is intended to mean a differential rotation rate of the pinion gear P1 (hereinafter, referred to as "pinion gear differential rotation rate") and is difference between the rotation rate at the time of rotation of the pinion gear P1 and the rotation rate of the carrier C1. When the transmission 20 continuously operates in a state in which the pinion gear differential rotation rate is higher than a certain boundary rotation rate, durability thereof might be deteriorated.

Therefore, the HVECU 90 of this embodiment is allowed to control the rotation of the transmission 20 so as to inhibit the deterioration in the durability of the transmission 20 when the unique motor EV driving is performed. Specifically, this inhibits increase in the pinion gear differential rotation rate of the transmission 20 by inhibiting the increase in the rotation rate of the ring gear R1 of the transmission 20 (rotation rate of the carrier C2 of the differential device 30), thereby controlling such that the pinion gear differential rotation rate is maintained so as not to be higher than a predetermined value (the above-described boundary rotation rate).

The rotation of the transmission 20 is controlled by the control of the first rotary machine MG1. The HVECU 90 controls the rotation rate of the first rotary machine MG1 to inhibit the increase in the rotation rate of the ring gear R1 of the transmission 20 (rotation rate of the carrier C2 of the differential device 30), thereby inhibiting the increase in the pinion gear differential rotation rate of the transmission 20.

Herein, when the unique motor EV driving is performed with the transmission 20 in the neutral state, rotation rate maintaining control at 0 of the illustrated first rotary machine MG1 is performed as described above. In the differential device 30, at the time of the forward movement, the carrier C2 rotates in the positive direction as the ring gear R2, and at the time of the rearward movement, the carrier C2 rotates in the negative direction as the ring gear R2. Therefore, at the time of the forward movement, the rotation rate of the sun gear S2 of the differential device 30 (MG1 rotation rate) may be decreased from 0 in the negative rotational direction in order to inhibit the increase in the rotation rate of the ring gear R1 of the transmission 20 (rotation rate of the carrier C2 of the differential device 30). At the time of the rearward movement, the rotation rate of the sun gear S2 of the differential device 30 (MG1 rotation rate) may be increased from 0 in the positive rotational direction in order to inhibit the increase in the rotation rate of the ring gear R1 of the transmission 20 (rotation rate of the carrier C2 of the differential device 30). That is to say, in the hybrid system 1-1, the first rotary machine MG1 is controlled such that an absolute value of the MG1 rotation rate is increased from 0 in order to inhibit the increase in the rotation rate of the ring gear R1 of the transmission 20 (rotation rate of the carrier C2 of the differential device 30) during the unique motor EV driving while the rotation rate maintaining control at 0 of the first rotary machine MG1 is performed. According to this, the hybrid system 1-1 may at least inhibit the increase in the pinion gear differential rotation rate of the transmission 20.

The control of the first rotary machine MG1 is carried out such that the pinion gear differential rotation rate of the transmission 20 is maintained so as not to be higher than the above-described boundary rotation rate. Therefore, the control of the first rotary machine MG1 may be performed before the pinion gear differential rotation rate becomes higher than the boundary rotation rate. However, the control of the first rotary machine MG1 might increase the electricity consumption. Therefore, in this illustration, a predetermined rotation rate for determining whether it is required to execute the control of the first rotary machine MG1 is set. The predetermined rotation rate is desirably set to the pinion gear differential rotation rate when the deterioration in the durability of the transmission 20 is required to be inhibited even if the electricity consumption is increased in consideration of the durability of the transmission 20 and the electricity consumption. For example, the predetermined rotation rate may be set to the above-described boundary rotation rate or to the pinion gear differential rotation rate lower than the boundary rotation rate by an allowance. The allowance is determined in consideration of a detection error, an arithmetic error and the like of the pinion gear differential rotation rate, for example.

Herein, when sensors for detecting a rotational angle of the rotation of the pinion gear P1 and a rotational angle of the carrier C1 are prepared, for example, the pinion gear differential rotation rate of the transmission 20 may be calculated by the HVECU 90 based on detection signals of the sensors. Therefore, if such sensors are provided, it is possible to determine whether it is required to execute the control of the first rotary machine MG1 (rotational control of the transmission 20) by comparing the pinion gear differential rotation rate of the transmission 20 calculated from the detection signals with the predetermined rotation rate. However, adding such sensors might increase in cost. Therefore, the illustrated HVECU 90 is allowed to determine whether it is required to execute the control of the first rotary machine MG1 based on a vehicle speed V having unique correspondence relationship with the pinion gear differential rotation rate of the transmission 20 (for example, the pinion gear differential rotation rate increases as the vehicle speed V increases). That is to say, the control of the first rotary machine MG1 may be performed before the vehicle speed V becomes higher than a predetermined vehicle speed (vehicle speed when the pinion gear differential rotation rate of the transmission 20 is at the boundary rotation rate) Vx or may be performed after the vehicle speed V becomes higher than a predetermined vehicle speed V1 in order to inhibit the increase in the electricity consumption. In this illustration, the latter case is described as an example. The predetermined vehicle speed V1 is the vehicle speed corresponding to the above-described predetermined rotation rate regarding the pinion gear differential rotation rate and may be set to the predetermined vehicle speed Vx or to the vehicle speed lower than the predetermined vehicle speed Vx by an allowance. The allowance is similar to the above-described allowance regarding the pinion gear differential rotation rate and is determined in consideration of a detection error, an arithmetic error and the like of the vehicle speed V, for example.

Figure 10:
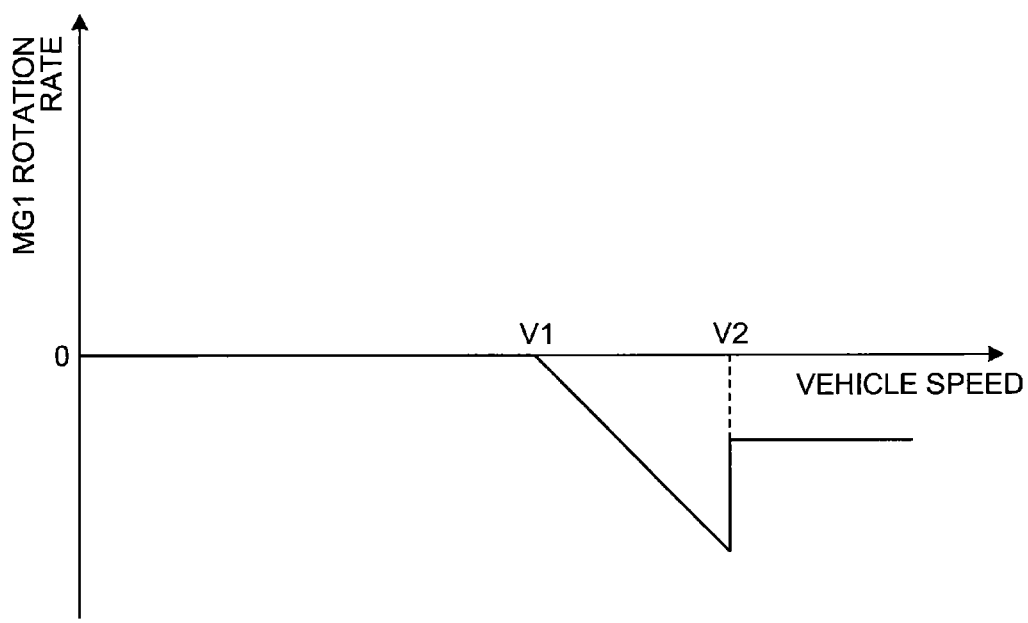
FIG. 10 is a view illustrating an example of a control form of an MG1 rotation rate in the embodiment.

For example, the MG1 rotation rate is controlled in accordance with a predetermined map. A map illustrated in FIG. 10 is that at the time of the forward movement in the unique motor EV mode in which the MG1 rotation rate is gradually decreased from 0 with a predetermined proportional coefficient as the vehicle speed V increases from the predetermined vehicle speed V1.

The MG1 rotation rate after the vehicle speed V becomes higher than the predetermined vehicle speed V1 may be set to the rotation rate which at least inhibits the increase in the rotation rate of the ring gear R1 of the transmission 20 (rotation rate of the carrier C2 of the differential device 30), in other words, the rotation rate which at least inhibits the increase in the pinion gear differential rotation rate of the transmission 20. The set value of the MG1 rotation rate may be used when, even if the vehicle speed V becomes slightly higher than the predetermined vehicle speed V1, the pinion gear differential rotation rate at that time may keep the deterioration in the durability of the transmission 20 within an allowable range.

The MG1 rotation rate at a higher vehicle speed than the predetermined vehicle speed V1 may also be set to the rotation rate which at least decreases the rotation rate of the ring gear R1 of the transmission 20 (rotation rate of the carrier C2 of the differential device 30) to a target rotation rate (rotation rate of the ring gear R1 and the carrier C2 when the vehicle speed V is at the predetermined vehicle speed V1), in other words, the rotation rate which at least decreases the pinion gear differential rotation rate of the transmission 20 to the target rotation rate (pinion gear differential rotation rate when the vehicle speed V is at the predetermined vehicle speed V1). The set value of the MG1 rotation rate may be used when the pinion gear differential rotation rate cannot keep the deterioration in the durability of the transmission 20 within the allowable range when the vehicle speed V becomes higher than the predetermined vehicle speed V1 only slightly. This case is intended to mean a case in which the predetermined vehicle speed V1 is set to the above-described predetermined vehicle speed Vx, for example.

As described above, when the transmission 20 is in the neutral state, the pinion gear differential rotation rate increases as the vehicle speed V increases and the durability thereof might be highly possibly deteriorated. Therefore, in this illustration, the above-described control of the first rotary machine MG1 may be executed when the unique motor EV driving is performed with the transmission 20 in the neutral state and when the vehicle speed V becomes higher than the predetermined vehicle speed V1.

In the hybrid system 1-1, the rotation of the second rotary machine MG2 and the driven wheel W is also transmitted to the ring gear R2 of the differential device 30, so that pinion differential rotation of the differential device 30 increases as the vehicle speed V increases. The pinion differential rotation is herein intended to mean a differential rotation rate of the pinion gear P2 (pinion gear differential rotation rate) and is difference between the rotation rate at the time of the rotation of the pinion gear P2 and the rotation rate of the carrier C2. In the hybrid system 1-1, when the vehicle speed V further increases from the predetermined vehicle speed V1 and the differential device 30 continuously operates in a state in which the pinion gear differential rotation rate is higher than a certain boundary rotation rate, durability of the differential device 30 might be deteriorated. Therefore, it is desired to control such that the pinion gear P2 does not rotate too much in the hybrid system 1-1.

Specifically, the HVECU 90 is allowed to control the rotation of the differential device 30 such that the pinion gear differential rotation rate of the differential device 30 is maintained so as not to be higher than a predetermined value (above-described boundary rotation rate of the differential device 30) so as to inhibit the deterioration in the durability of the differential device 30. The control of the rotation of the differential device 30 is executed by the control of the transmission 20 in the directly coupled state or the overdrive state. The HVECU 90 is allowed to control the transmission 20 in the directly coupled state or the overdrive state when the pinion gear differential rotation rate of the differential device 30 becomes higher than a predetermined rotation rate. For example, the predetermined rotation rate may be set to the above-described boundary rotation rate of the pinion gear differential rotation rate in the differential device 30 or to the pinion gear differential rotation rate lower than the boundary rotation rate by an allowance. The allowance is determined in consideration of a detection error, an arithmetic error and the like of the pinion gear differential rotation rate, for example.

Herein, when sensors for detecting a rotational angle of the rotation of the pinion gear P2 and a rotational angle of the carrier C2 are provided as in the case of inhibiting the increase in the pinion gear differential rotation rate of the transmission 20, it is possible to determine whether it is required to execute rotational control of the differential device 30 by detecting the rotational angles from detection signals of the sensors and comparing the pinion gear differential rotation rate of the differential device 30 grasped based on the rotational angles with the predetermined rotation rate. However, in the case of the differential device 30 also, the illustrated HVECU 90 is allowed to determine whether it is required to execute the rotational control of the differential device 30 based on the vehicle speed V in order to inhibit the increase in cost by adding the sensors. That is to say, the HVECU 90 is allowed to control the transmission 20 in the directly coupled state or the overdrive state when the vehicle speed V becomes higher than a predetermined vehicle speed V2 (>V1), thereby controlling the pinion gear differential rotation rate of the differential device 30 to be maintained so as not to be higher than a predetermined rotation rate. The predetermined vehicle speed V2 is the vehicle speed corresponding to the above-described predetermined rotation rate regarding the pinion gear differential rotation rate of the differential device 30 and may be set to the vehicle speed when the pinion gear differential rotation rate is at the boundary rotation rate or to the vehicle speed lower than the vehicle speed by an allowance. The allowance is determined in consideration of the detection error, the arithmetic error and the like of the vehicle speed V, for example. In this illustration, as illustrated in FIG. 10, when the vehicle speed V becomes higher than the predetermined vehicle speed V2, the MG1 rotation rate which is decreased heretofore is increased to be maintained at a predetermined rotation rate of the negative rotation.

Figure 11:
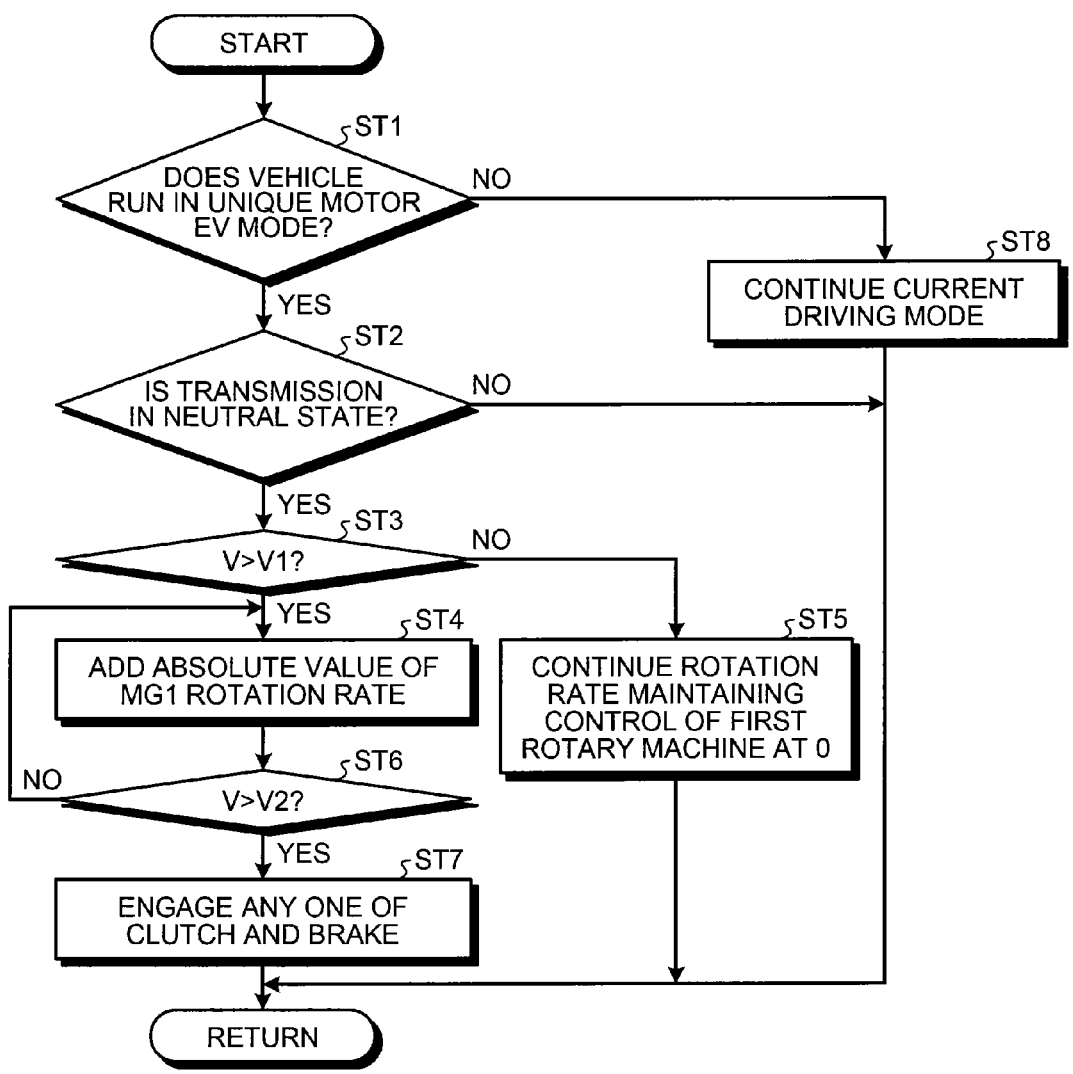
FIG. 11 is a flowchart illustrating operation during the unique motor EV driving in the embodiment.

Hereinafter, arithmetic processing operation in the EV driving is described with reference to a flowchart in FIG. 11 and a time chart in FIG. 12.

Figure 12:
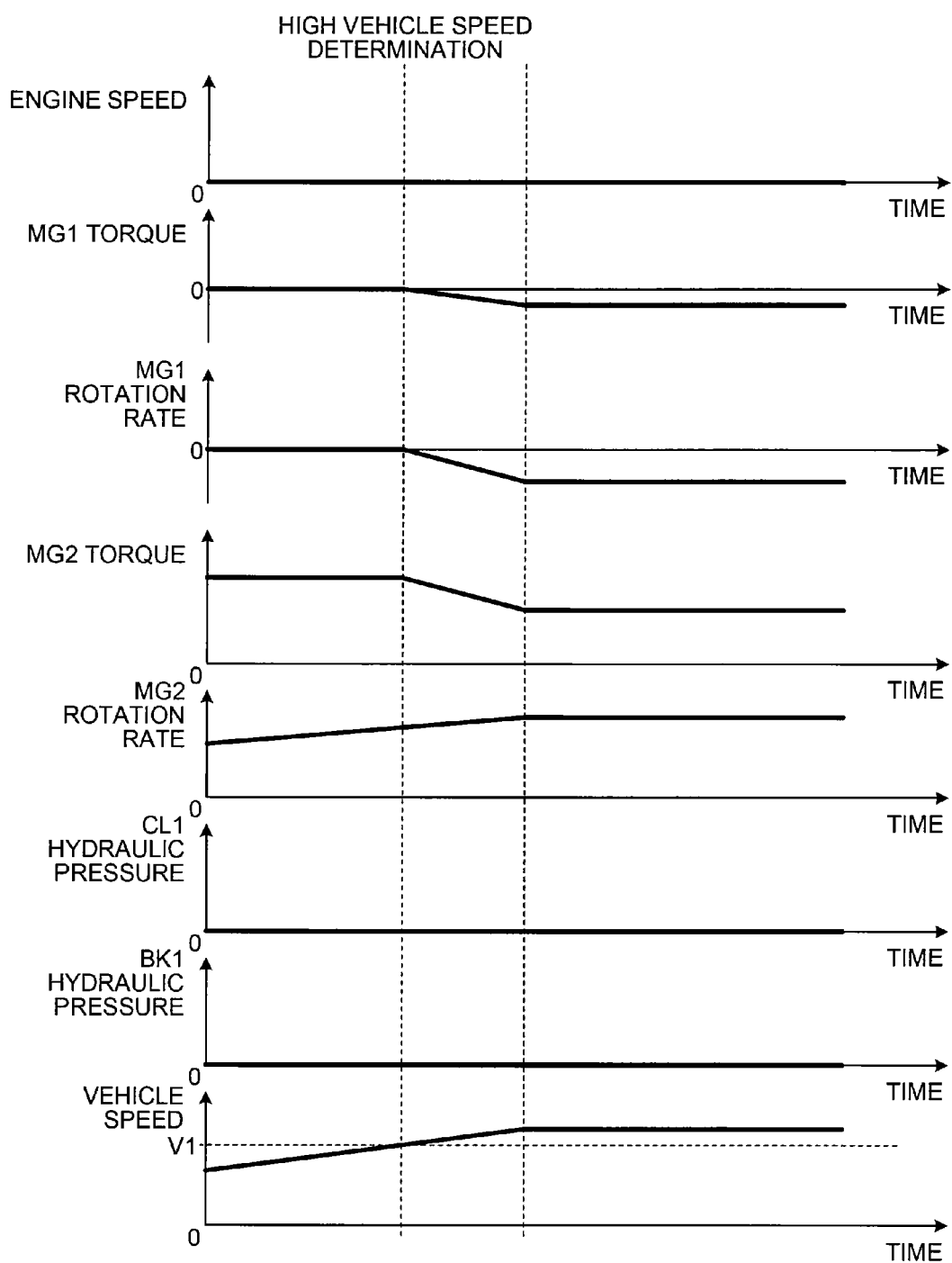
FIG. 12 is a time chart illustrating the operation during the unique motor EV driving in the embodiment.

The hybrid vehicle 100 illustrated in the time chart in FIG. 12 runs in an accelerated manner in the forward movement direction in the unique motor EV mode. At that time, the second rotary machine MG2 outputs the positive MG2 torque in the positive rotation. In the illustrated hybrid vehicle 100, a control hydraulic pressure of the clutch CL1 (CL1 hydraulic pressure) and a control hydraulic pressure of the brake BK1 (BK1 hydraulic pressure) are set to 0 and both the clutch CL1 and the brake BK1 are put into the disengaged state to control the transmission 20 in the neutral state. In the illustrated hybrid vehicle 100, the rotation rate maintaining control to maintain the MG1 rotation rate at 0 is performed during acceleration driving. Meanwhile, in this illustration, the rotation rate maintaining control is performed while the MG1 torque is kept at 0.

The HVECU 90 determines whether the driving in the unique motor EV mode is being performed (step ST1). The HVECU 90 shifts to a next arithmetic process when the unique motor EV driving is being performed. On the other hand, when the unique motor EV driving is not being performed, the HVECU 90 continues the driving in the current driving mode (HV driving mode or both motor EV mode) (step ST8) and returns to step ST1.

The HVECU 90 determines whether the transmission 20 is in the neutral state when the unique motor EV driving is being performed (step ST2). This is determined based on the command value of the supply hydraulic pressure to the clutch CL1 (PbCL1) and the command value of the supply hydraulic pressure to the brake BK1 (PbBK1), for example. At step ST2, when both the CL1 hydraulic pressure and the BK1 hydraulic pressure are set to 0, it is determined that the transmission 20 is in the neutral state.

When the transmission 20 is not in the neutral state, the pinion gear differential rotation rate of the transmission 20 is less likely to be excessive, so that the HVECU 90 temporarily finishes the arithmetic process to return to step ST1.

On the other hand, when the transmission 20 is in the neutral state, the pinion gear differential rotation rate of the transmission 20 might be excessive, so that the HVECU 90 determines whether the vehicle speed V becomes higher than the predetermined vehicle speed V1 (step ST3).

When the vehicle speed V becomes higher than the predetermined vehicle speed V1, the HVECU 90 increases the absolute value of the MG1 rotation rate of the first rotary machine MG1 (step ST4). The rotation rate maintaining control at 0 of the illustrated first rotary machine MG1 is performed during the forward movement, so that the MG1 rotation rate is herein decreased from 0 in the negative rotational direction. According to this, in the hybrid vehicle 100, the increase in the rotation rate of the carrier C2 of the differential device 30 (rotation rate of the ring gear R1 of the transmission 20) is inhibited, so that the increase in the pinion gear differential rotation rate of the transmission 20 is inhibited with the acceleration driving continued. Herein, the pinion gear differential rotation rate is controlled so as not to be higher than the above-described predetermined rotation rate. Therefore, in the hybrid vehicle 100, it is possible to inhibit the deterioration in the durability of the transmission 20 in association with the increase in the vehicle speed V.

At that time, the HVECU 90 allows the first rotary machine MG1 to generate the negative MG1 torque in association with the decrease in the MG1 rotation rate and decreases the positive MG2 torque of the second rotary machine MG2 in association with the increase in the negative MG1 torque (FIG. 12). According to this, in the hybrid system 1-1, variation in driving torque on the driven wheel W caused by the control of the first rotary machine MG1 may be inhibited. In contrast, when a torque transmission capacity of the clutch CL1 and the brake BK1 remains (including the semi-engaged state) or when an effect of inertia in the clutch CL1 and the brake BK1 is large, the MG1 torque is transmitted to the driven wheel W as directly transmitted torque. In this illustration, the negative MG1 torque is increased, so that the driving torque might be decreased on the driven wheel W. Therefore, when the driving torque might be decreased by such cause, the positive MG2 torque is increased in order to inhibit the decrease in the driving torque.

On the other hand, when the vehicle speed V is not higher than the predetermined vehicle speed V1, the HVECU 90 continues the rotation rate maintaining control at 0 of the first rotary machine MG1 (step ST5) and returns to step ST1.

When the absolute value of the MG1 rotation rate is increased, the HVECU 90 determines whether the vehicle speed V becomes higher than the predetermined vehicle speed V2 (>V1) (step ST6).

When the vehicle speed V is not higher than the predetermined vehicle speed V2, the HVECU 90 returns to step ST4 to continue increasing control of the absolute value of the MG1 rotation rate. When the vehicle speed V becomes higher than the predetermined vehicle speed V2, the HVECU 90 engages any one of the clutch CL1 and the brake BK1 to control the transmission 20 in the directly coupled state or the overdrive state (step ST7) and returns to step ST1. According to this, in the hybrid vehicle 100, the pinion gear differential rotation rate of the differential device 30 is controlled so as not to be higher than the above-described predetermined rotation rate, so that the deterioration in the durability of the differential device 30 in association with the increase in the vehicle speed V may be inhibited. At that time, the HVECU 90 engages any one of the clutch CL1 and the brake BK1 and increases the negative MG1 rotation rate (FIG. 10).

In this manner, in the hybrid vehicle 100, the increase in the pinion gear differential rotation rate of the transmission 20 and that of the differential device 30 may be inhibited and each pinion gear differential rotation rate may be maintained so as not to be higher than the predetermined rotation rate, so that it is possible to inhibit the deterioration in the durability of the transmission 20 and the differential device 30.

Meanwhile, the time chart in FIG. 12 illustrates a case in which constant speed driving is realized before the vehicle speed V reaches the predetermined vehicle speed V2. Therefore, in the time chart, the MG1 torque, the MG2 torque, the MG1 rotation rate, and the MG2 rotation rate are maintained as those when a target vehicle speed of the constant speed driving is realized.

Herein, in a configuration of the hybrid system 1-1, when the transmission 20 is controlled in the neutral state in the both motor EV mode, the engine rotary shaft 11 of the stopping engine ENG is rotated, so that the drag loss is generated on the engine ENG. Therefore, it is described in this embodiment that the transmission 20 is not controlled in the neutral state in the both motor EV mode. However, in the hybrid system 1-1 also, it is possible to perform the driving in the both motor EV mode (hereinafter, referred to as "both motor EV driving") in a state in which the transmission 20 is controlled in the neutral state when the drag loss of the engine ENG is negligibly small, for example. For example, when a clutch (not illustrated) is provided between the engine rotary shaft 11 and the first power transmission element of the transmission 20 (carrier C1 in this illustrated configuration), the drag loss is not generated on the engine ENG because the clutch shuts down the power transmission between the engine rotary shaft 11 and the first power transmission element of the transmission 20 even when the transmission 20 is controlled in the neutral state during the both motor EV driving. In this manner, in the configuration of the hybrid system 1-1 or a similar configuration (with the clutch), the transmission 20 might be controlled in the neutral state during the both motor EV driving. Therefore, also when the both motor EV driving is being performed, when the transmission 20 is controlled in the neutral state, the pinion gear differential rotation rate of the transmission 20 might increase in association with the increase in the vehicle speed V and the durability of the transmission 20 might be deteriorated.

Based on this, the HVECU 90 may be allowed to execute the rotation rate control of the first rotary machine MG1 when the vehicle speed V becomes higher than the predetermined vehicle speed V1 or when the pinion gear differential rotation rate of the transmission 20 becomes higher than the predetermined rotation rate even when the both motor EV driving is being performed with the transmission 20 in the neutral state. In this case also, the transmission 20 is controlled such that the pinion gear differential rotation rate is maintained so as not to be higher than the above-described predetermined rotation rate, so that the deterioration in the durability thereof may be inhibited. Meanwhile, in this case, it is desirable to execute the rotation rate control of the first rotary machine MG1 after switching to the unique motor EV mode in order to inhibit drop (decrease) in the driving torque on the driven wheel W.

In this case also, when the vehicle speed V becomes higher than the predetermined vehicle speed V2, the pinion gear differential rotation rate of the differential device 30 also is maintained so as not to be higher than the predetermined rotation rate by the engagement of any one of the clutch CL1 and the brake BK1 to control the transmission 20 in the directly coupled state or the overdrive state. Therefore, the hybrid system 1-1 may inhibit the deterioration in the durability of the transmission 20 and the differential device 30 even when the both motor EV driving is being performed with the transmission 20 in the neutral state.

[First Variation]

Figure 13:
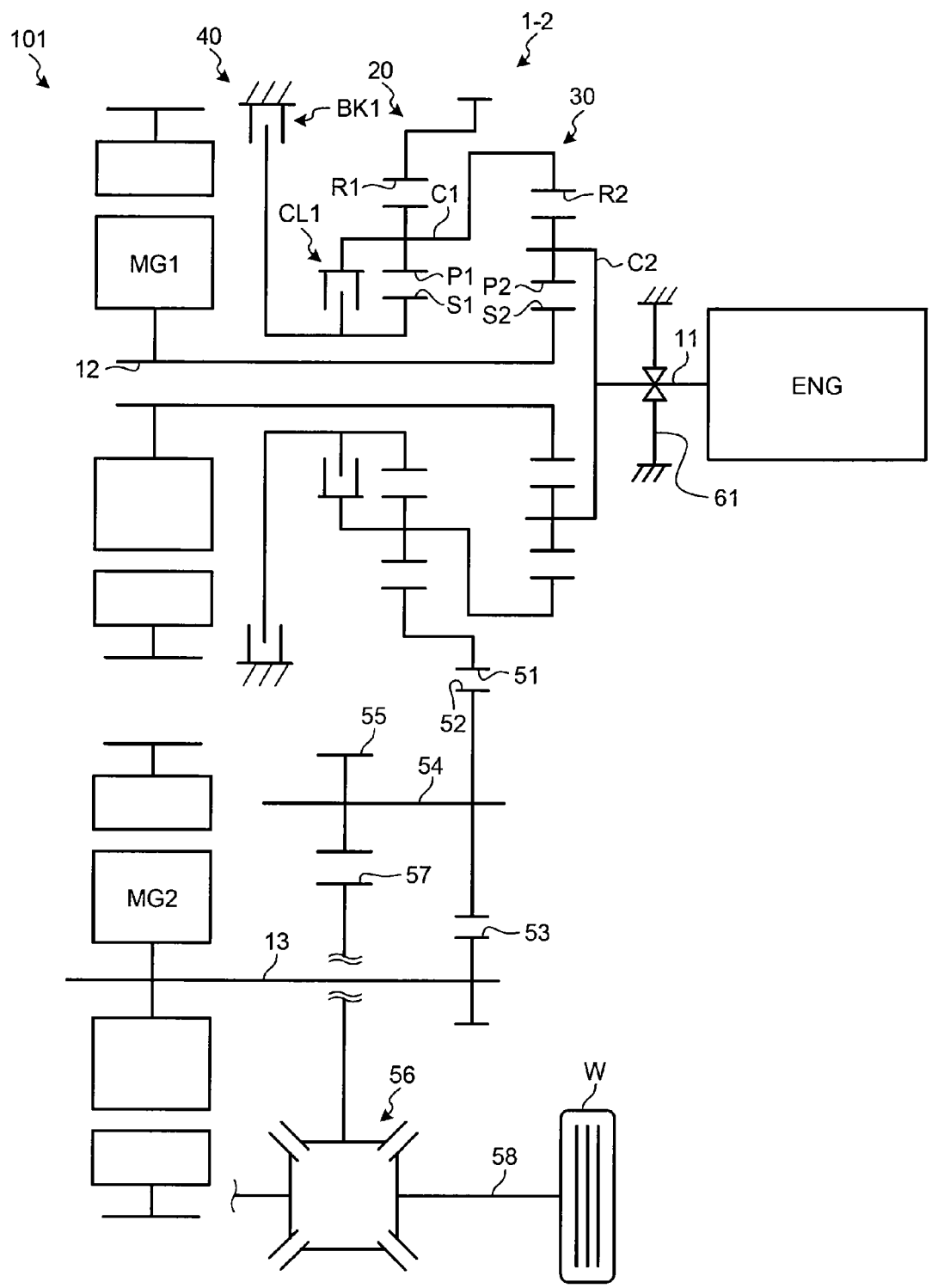
FIG. 13 is a skeleton diagram illustrating a configuration of a power transmission device of a hybrid vehicle and a hybrid system of a first variation.

The above-described technology of the embodiment may also be applied to a hybrid system 1-2 illustrated in FIG. 13 below and it is possible to inhibit increase in pinion gear differential rotation rate of a transmission 20 and in pinion gear differential rotation rate of a differential device 30 as in the embodiment, thereby obtaining an effect similar to that of the embodiment. Reference numeral 101 in FIG. 13 represents a hybrid vehicle on which the hybrid system 1-2 is mounted.

The hybrid system 1-2 is provided with an engine ENG, a first rotary machine MG1, and a second rotary machine MG2 as power sources and is further provided with a power transmission device including the transmission 20, the differential device 30, and a transmission control device 40 as in the hybrid system 1-1. Each power source is the same as that of the hybrid system 1-1. On the other hand, the power transmission device has following difference in configuration from the power transmission device of the hybrid system 1-1.

An arrangement of the transmission 20 and the differential device 30 connected in series and a connecting form thereof are different in the power transmission device of the hybrid system 1-2.

The transmission 20 is provided with a planetary mechanism (specifically, single-pinion planetary gear mechanism) formed of a plurality of transmission rotational elements capable of performing differential rotation. In this illustration also, a sun gear S1 is connected to a brake BK1 of the transmission control device 40. In this illustration also, a clutch CL1 of the transmission control device 40 is interposed between the sun gear S1 and a carrier C1.

In the hybrid system 1-2, however, the carrier C1 is connected to the differential device 30 to transmit power to/from the differential device 30. In the hybrid system 1-2, the engine ENG is connected to the differential device 30, so that the carrier C1 serves as a first power transmission element which transmits the power to/from the engine ENG. In the hybrid system 1-2, a ring gear R1 of the transmission 20 serves as an output of the power transmission device formed of the transmission 20 and the differential device 30 and is connected to the second rotary machine MG2 and a driven wheel W through a counter drive gear 51 and the like. The ring gear R1 rotates integrally with the counter drive gear 51. Therefore, the ring gear R1 serves as a second power transmission element in the illustrated transmission 20.

The differential device 30 is provided with a planetary mechanism (specifically, single-pinion planetary gear mechanism) formed of a plurality of differential rotational elements capable of performing the differential rotation. In this illustration also, a sun gear S2 is connected to an MG1 rotary shaft 12.

However, in the hybrid system 1-2, a carrier C2 is connected to the engine ENG through a clutch 61. The clutch 61 is a clutch device engaged when engine torque is transmitted to the differential device 30 and disengaged when torque is to be transmitted from the differential device 30 to the engine ENG. That is to say, the clutch 61 may integrally rotate the carrier C2 with an engine rotary shaft 11 when the engine torque is transmitted to the differential device 30 and prevent power transmission between the carrier C2 and the engine rotary shaft 11 when the torque is to be transmitted from the differential device 30 to the engine ENG. Operation of the clutch 61 may be controlled by a HVECU 90 and an engine ECU 91 or the clutch 61 may be a one-way clutch performing the operation. The clutch 61 being disengaged may control a rotation rate of the carrier C1 of the transmission 20 by control of an MG1 rotation rate.

In the hybrid system 1-2, a ring gear R2 is connected to the carrier C1 of the transmission 20 such that the ring gear R2 may be integrally rotated with the carrier C1.

FIG. 14 illustrates an operation engagement table of the hybrid system 1-2. A circle mark and the like is the same as that in FIG. 3 above.

[Unique Motor EV Mode]

When a secondary battery may be charged, both the clutch CL1 and the brake BK1 are disengaged and the transmission 20 is controlled in a neutral state. In the unique motor EV mode (engine braking is not required), it is possible to obtain regenerative power without the engine braking used as in the hybrid system 1-1, so that fuel consumption (electricity consumption) is improved. On the other hand, when the charge of the secondary battery is prohibited, the engine ENG is put into a dragged state by engagement only one of the clutch CL1 and the brake BK1, and the engine braking is generated. In this case also, the HVECU 90 increases an engine speed by control of the first rotary machine MG1 as in the hybrid system 1-1.

At the time of rearward movement, when the secondary battery may be charged, it is possible to disengage both the clutch CL1 and the brake BK1 to drive only by power of the second rotary machine MG2 or to engage both the clutch CL1 and the brake BK1 to fix the carrier C1 of the transmission 20, thereby driving by the power of both the first and second rotary machines MG1 and MG2.

[Both Motor EV Mode]

In the both motor EV mode, a following point is different from the hybrid system 1-1. The HVECU 90 engages only one of the clutch CL1 and the brake BK1, thereby controlling the transmission 20 in a directly coupled state or an overdrive state when the engine braking is used together in the both motor EV mode.

[HV Driving Mode]

The hybrid system 1-2 uses a HV high mode and a HV low mode according to a vehicle speed as in the hybrid system 1-1. Therefore, there are two mechanical points also in the hybrid system 1-2, so that transmission efficiency at the time of operation with a high gear may be improved, and the fuel consumption at the time of high vehicle speed driving may be improved in the HV driving mode.

In the HV high mode, the clutch CL1 is disengaged and the brake BK1 is engaged, and according to this, the transmission 20 is switched to a high speed position and it is controlled such that rotation of the engine ENG is accelerated to be output. On the other hand, in the HV low mode, the clutch CL1 is engaged and the brake BK1 is disengaged, and according to this, the transmission 20 is switched to a low speed position and it is controlled such that the rotation of the engine ENG is output at the same speed. In the hybrid system 1-2 also, cooperative transmission control to shift gears of the transmission 20 and the differential device 30 at the same time is executed when it is switched between the HV high mode and the HV low mode. Therefore, the hybrid system 1-2 may be operated as an electric continuously variable transmission in which a system gear ratio is continuously changed by electric control of the rotation of the first rotary machine MG1.

At the time of the rearward movement, the first rotary machine MG1 and the second rotary machine MG2 are operated as a generator and a motor, respectively, in the HV low mode, and the second rotary machine MG2 is rotated in the direction opposite to that of the forward movement.

[Second Variation]

In the hybrid system 1-1 described in the embodiment, as described above, the pinion gear differential rotation rate of the differential device 30 increases as the vehicle speed V increases during the unique motor EV driving. During the both motor EV driving also, the rotation of the first rotary machine MG1 is transmitted to the sun gear S2 and the rotation of the driven wheel W is transmitted to the ring gear R2, so that the pinion gear differential rotation rate increases as the vehicle speed V increases in the differential device 30. Therefore, in the hybrid system 1-1, when the vehicle speed V becomes higher than a predetermined vehicle speed Vy, the excessive pinion gear differential rotation rate might deteriorate the durability of the differential device 30. The predetermined vehicle speed Vy is the vehicle speed at which the pinion gear differential rotation rate of the differential device 30 is at the boundary rotation rate.

Therefore, a HVECU 90 of this variation is allowed to control rotation of a differential device 30 so as to inhibit deterioration in durability of the differential device 30 during EV driving (unique motor EV driving or both motor EV driving). Specifically, this inhibits increase in pinion gear differential rotation rate of the differential device 30 by inhibiting decrease in rotation rate of a carrier C2 of the differential device 30 (rotation rate of a ring gear R1 of a transmission 20), thereby controlling such that the pinion gear differential rotation rate is maintained so as not to be higher than a boundary rotation rate. The control in this variation may be executed after the control to inhibit the increase in the pinion gear differential rotation rate of the transmission 20 in the embodiment in place of control into a directly coupled state or an overdrive state of the transmission 20 (control to inhibit the increase in the pinion gear differential rotation rate of the differential device 30 by this control). The control in this variation may also be executed even when the control to inhibit the increase in the pinion gear differential rotation rate of the transmission 20 in the embodiment is not executed.

The rotation of the differential device 30 is controlled by control of a first rotary machine MG1. The HVECU 90 controls a rotation rate of the first rotary machine MG1 to inhibit the decrease in the rotation rate of the carrier C2 of the differential device 30 (rotation rate of the ring gear R1 of the transmission 20), thereby inhibiting the increase in the pinion gear differential rotation rate of the differential device 30.

For example, when the control to inhibit the increase in the pinion gear differential rotation rate of the transmission 20 in the embodiment is executed at the time of forward movement, the first rotary machine MG1 (sun gear S2 of the differential device 30) is operated in negative rotation during the unique motor EV driving. Therefore, the HVECU 90 is allowed to inhibit the decrease in the rotation rate of the carrier C2 of the differential device 30 (rotation rate of the ring gear R1 of the transmission 20) by decreasing an absolute value of the MG1 rotation rate (increasing the MG1 rotation rate), thereby inhibiting the increase in the pinion gear differential rotation rate of the differential device 30. On the other hand, when the control to inhibit the increase in the pinion gear differential rotation rate of the transmission 20 in the embodiment is executed at the time of rearward movement, the first rotary machine MG1 (sun gear S2 of the differential device 30) rotates in a positive direction during the unique motor EV driving. Therefore, the HVECU 90 is allowed to inhibit the decrease in the rotation rate of the carrier C2 of the differential device 30 (rotation rate of the ring gear R1 of the transmission 20) by decreasing the absolute value of the MG1 rotation rate (decreasing the MG1 rotation rate), thereby inhibiting the increase in the pinion gear differential rotation rate of the differential device 30.

When the both motor EV driving is being performed, the HVECU 90 is allowed to decrease MG1 torque to 0 and switch a driving mode from a both motor EV mode to a unique motor EV mode. The driving mode is switched for inhibiting drop (decrease) of driving torque on a driven wheel W when rotation speed maintaining control of an engine ENG at 0 to be described later is performed. The HVECU 90 is allowed to inhibit the decrease in the rotation rate of the carrier C2 of the differential device 30 (rotation rate of the ring gear R1 of the transmission 20) by decreasing the absolute value of the MG1 rotation rate as described above during the unique motor EV driving, thereby inhibiting the increase in the pinion gear differential rotation rate of the differential device 30.

The first rotary machine MG1 is controlled such that the pinion gear differential rotation rate of the differential device 30 is maintained so as not to be higher than the boundary rotation rate. Therefore, the control of the first rotary machine MG1 may be performed before the pinion gear differential rotation rate becomes higher than the boundary rotation rate. However, in this illustration, a predetermined rotation rate for determining whether it is required to execute the control of the first rotary machine MG1 is set in order to inhibit increase in electricity consumption. The predetermined rotation rate is desirably set to the pinion gear differential rotation rate when the deterioration in the durability of the differential device 30 is required to be inhibited even if the electricity consumption is increased. For example, the predetermined rotation rate may be set to the above-described boundary rotation rate or to the pinion gear differential rotation rate lower than the boundary rotation rate by an allowance. The allowance is determined in consideration of a detection error, an arithmetic error and the like of the pinion gear differential rotation rate, for example.

Herein, when sensors for detecting a rotational angle of rotation of a pinion gear P2 and a rotational angle of the carrier C2 are prepared, for example, the pinion gear differential rotation rate of the differential device 30 may be calculated by the HVECU 90 based on detection signals of the sensors. Therefore, if such sensors are provided, it is possible to determine whether it is required to execute the control of the first rotary machine MG1 (rotational control of the differential device 30) by comparing the pinion gear differential rotation rate of the differential device 30 calculated from the detection signals with the predetermined rotation rate. However, adding such sensors might increase in cost. Therefore, the illustrated HVECU 90 is allowed to determine whether it is required to execute the control of the first rotary machine MG1 based on a vehicle speed V having unique correspondence relationship with the pinion gear differential rotation rate of the differential device 30. That is to say, the control of the first rotary machine MG1 may be performed before the vehicle speed V becomes higher than a predetermined vehicle speed Vy or may be performed after the vehicle speed V becomes higher than a predetermined vehicle speed Va in order to inhibit the increase in the electricity consumption. In this illustration, the latter case is described as an example. The predetermined vehicle speed Va is set to the vehicle speed the same as the predetermined vehicle speed V2 described in the embodiment (>V1).

Figure 15:
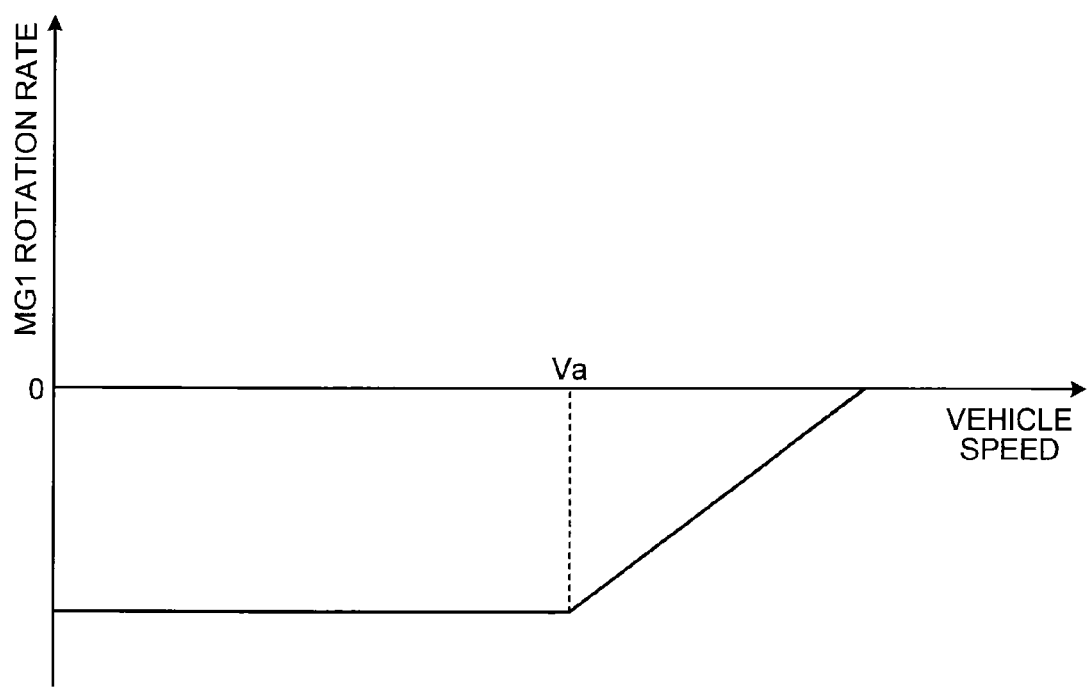
FIG. 15 is a view illustrating an example of a control form of an MG1 rotation rate in a second variation.

For example, the MG1 rotation rate is controlled in accordance with a predetermined map. A map illustrated in FIG. 15 is that at the time of the forward movement in which the MG1 rotation rate in the negative rotation is gradually increased toward 0 with a predetermined proportional coefficient as the vehicle speed V increases from the predetermined vehicle speed Va. Although the MG1 rotation rate in the negative rotation is herein gradually increased, the MG1 rotation rate in the negative rotation may be increased so as to reach 0 immediately.

The MG1 rotation rate after the vehicle speed V becomes higher than the predetermined vehicle speed Va may be set to the rotation rate which at least inhibits the increase in the pinion gear differential rotation rate of the differential device 30. The set value of the MG1 rotation rate may be used when, even if the vehicle speed V becomes slightly higher than the predetermined vehicle speed Va, the pinion gear differential rotation rate at that time may keep the deterioration in the durability of the differential device 30 within an allowable range.

The MG1 rotation rate at a higher vehicle speed than the predetermined vehicle speed Va may be set to the rotation rate which at least decreases the pinion gear differential rotation rate of the differential device 30 to a target rotation rate (pinion gear differential rotation rate when the vehicle speed V is at the predetermined vehicle speed Va). The set value of the MG1 rotation rate may be used when the pinion gear differential rotation rate cannot keep the deterioration in the durability of the differential device 30 within the allowable range when the vehicle speed V becomes higher than a predetermined vehicle speed V1 only slightly. This case is intended to mean a case in which the predetermined vehicle speed Va is set to the above-described predetermined vehicle speed Vy, for example.

In the hybrid system 1-1, the engine ENG might be dragged in association with the control of the first rotary machine MG1. Therefore, the HVECU 90 is allowed to control at least one of a clutch CL1 and a brake BK1 into a disengaged state or a semi-engaged state in the unique motor EV mode before the control of the first rotary machine MG1 is started or at the same time as the control is started in order to decrease the absolute value of the MG1 rotation rate while maintaining an engine speed at 0.

Figure 16:
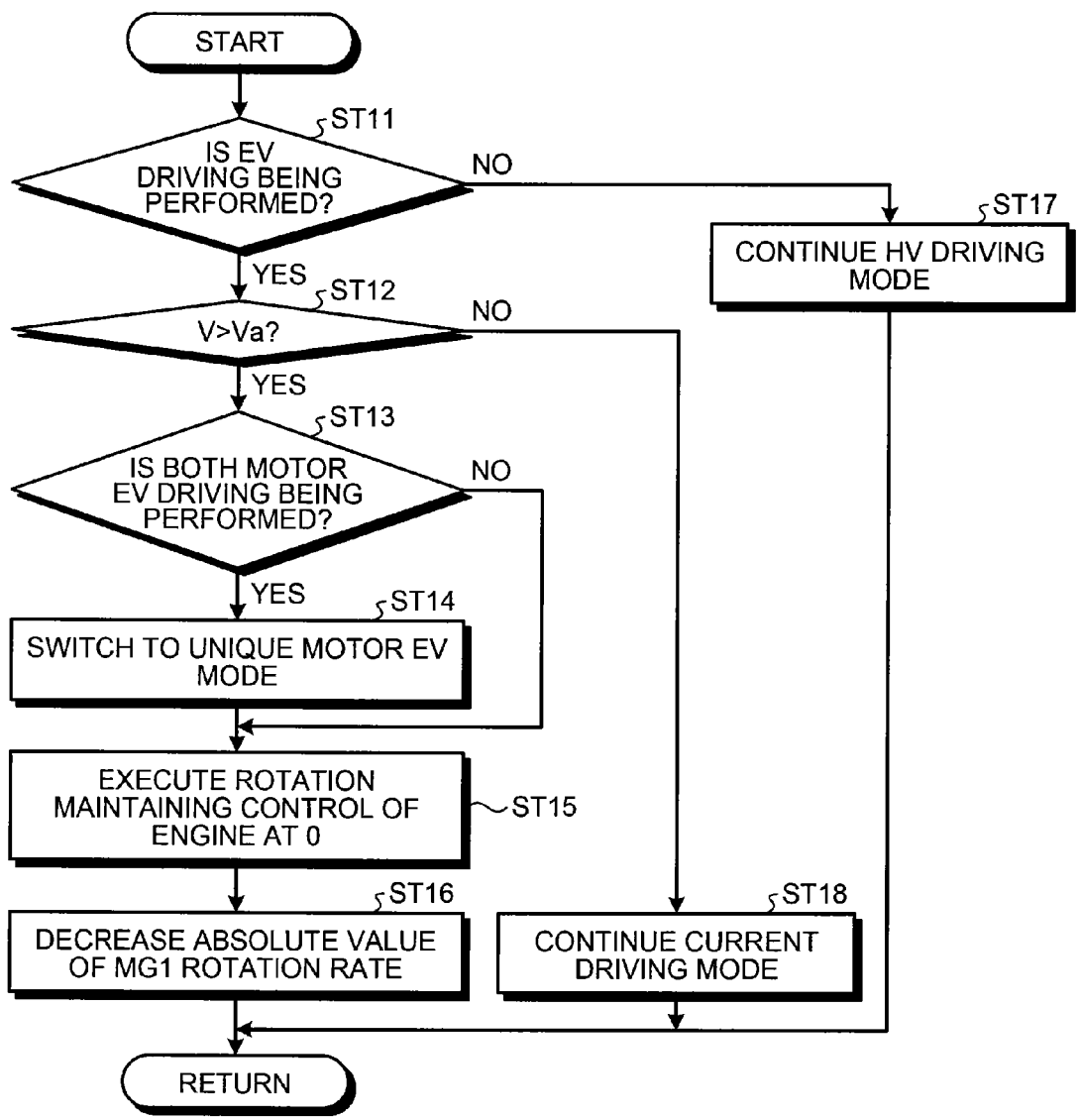
FIG. 16 is a flowchart illustrating operation during EV driving in the second variation.

Hereinafter, arithmetic processing operation in this variation is described with reference to a flowchart in FIG. 16 and a time chart in FIG. 17.

Figure 17:
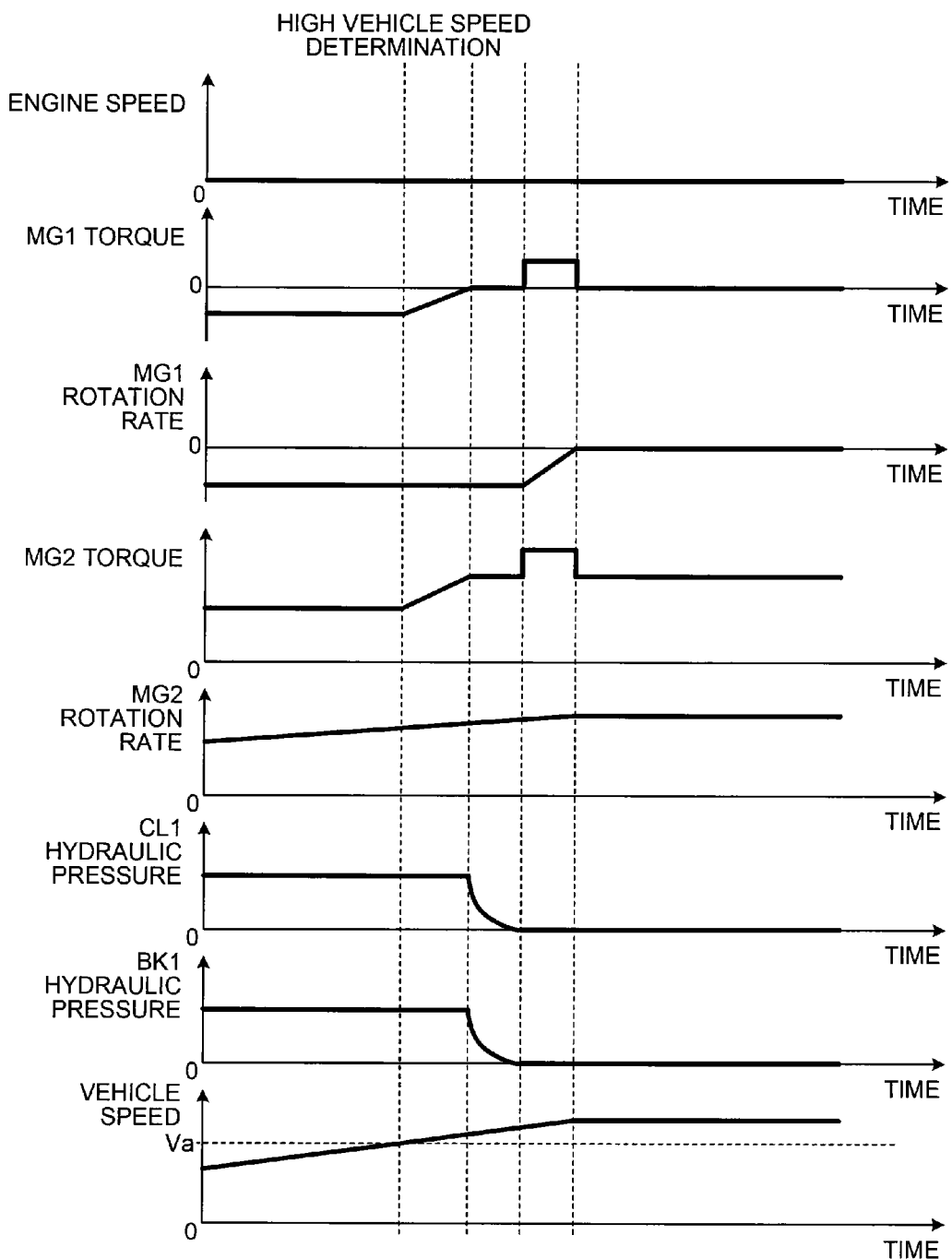
FIG. 17 is a time chart illustrating the operation during the EV driving in the second variation.

A hybrid vehicle 100 illustrated in the time chart in FIG. 17 runs in an accelerated manner in a forward movement direction in the both motor EV mode by the first rotary machine MG1 (operated in the negative rotation with negative torque) and a second rotary machine MG2 (operated in positive rotation with positive torque). In the illustrated hybrid vehicle 100, since the both motor EV driving is performed, a control hydraulic pressure of the clutch CL1 (CL1 hydraulic pressure) and a control hydraulic pressure of the brake BK1 (BK1 hydraulic pressure) are generated and both the clutch CL1 and the brake BK1 are put into an engaged state to control the engine speed at 0.

The HVECU 90 determines whether the EV driving is being performed (step ST11). The HVECU 90 shifts to a next arithmetic process when the EV driving is being performed. On the other hand, when the EV driving is not being performed, the HVECU 90 continues the driving in a current HV driving mode (step ST17) and returns to step ST11.

The HVECU 90 determines whether the vehicle speed V becomes higher than the predetermined vehicle speed Va when the EV driving is being performed (step ST12). When the vehicle speed V is higher than the predetermined vehicle speed Va, the HVECU 90 shifts to a next arithmetic process. On the other hand, when the vehicle speed V is not higher than the predetermined vehicle speed Va, the HVECU 90 continues the driving in the current driving mode (step ST18) and returns to step ST11. At step ST18, when the unique motor EV driving is being performed, control to put any one of the clutch CL1 and the brake BK1 into the engaged state according to a predetermined transmission pattern is performed. In the case of the both motor EV driving, the engaged states of both the clutch CL1 and the brake BK1 are maintained.

The HVECU 90 determines whether the both motor EV driving is being performed when the vehicle speed V is higher than the predetermined vehicle speed Va (step ST13).

The HVECU 90 switches the driving mode to the unique motor EV mode when the both motor EV driving is being performed (step ST14). In the time chart in FIG. 17, the negative MG1 torque is controlled at 0 while the MG1 rotation rate is maintained in the negative rotation. At that time, the HVECU 90 increases the positive MG2 torque by the decrease in the MG1 torque. According to this, in the hybrid vehicle 100, variation in the driving torque on the driven wheel W caused by the control of the MG1 torque may be inhibited.

The HVECU 90 prepares the rotation speed maintaining control of the engine ENG at 0 (0 rotation maintaining control) when it is determined that the unique motor EV mode is already performed at step ST13 or after the mode is switched to the unique motor EV mode at step ST14 (ST15). Specifically, as described above, at least one of the clutch CL1 and the brake BK1 is controlled into the disengaged state or the semi-engaged state: in the time chart in FIG. 17, both of them are controlled into the disengaged state.

The HVECU 90 decreases the absolute value of the MG1 rotation rate of the first rotary machine MG1 after finishing preparing the 0 rotation maintaining control (step ST16). The illustrated first rotary machine MG1 is operated in the negative rotation, so that the MG1 rotation rate is herein decreased from the negative rotation to 0. According to this, in the hybrid vehicle 100, the decrease in the rotation rate of the carrier C2 of the differential device 30 (rotation rate of the ring gear R1 of the transmission 20) is inhibited and the pinion gear differential rotation rate of the differential device 30 is inhibited so as not to be higher than the above-described predetermined rotation rate, so that the deterioration in the durability of the differential device 30 may be inhibited. In the hybrid vehicle 100, the rotation of the engine ENG is maintained at 0, so that deterioration in fuel consumption by a drag loss of the engine ENG may also be inhibited. Meanwhile, herein, the increase in the pinion gear differential rotation rate of the differential device 30 is inhibited by the increase in the rotation rate of the carrier C2 of the differential device 30 (rotation rate of the ring gear R1 of the transmission 20).

Therefore, at that time, the HVECU 90 allows the first rotary machine MG1 to generate the positive MG1 torque together with the increase in the MG1 rotation rate. As described in the embodiment also, when a torque transmission capacity of the clutch CL1 and the brake BK1 remains (including the semi-engaged state) or when an effect of inertia in the clutch CL1 and the brake BK1 is large, the MG1 torque is transmitted to the driven wheel W as directly transmitted torque and this might decrease the driving torque on the driven wheel W. Therefore, in order to inhibit the decrease in the driving torque, the HVECU 90 is allowed to increase the positive MG2 torque (FIG. 17).

In this manner, in the hybrid vehicle 100, the increase in the pinion gear differential rotation rate of the differential device 30 is inhibited and the pinion gear differential rotation rate may be maintained so as not to be higher than the predetermined rotation rate, so that the deterioration in the durability of the differential device 30 may be inhibited.

Although a two-position transmission 20 is described as an example in the above-described embodiment and first and second variations, the transmission 20 may have three or more gear positions or this may be a continuously variable transmission. In a case of a stepped transmission, the transmission 20 may be such that a plurality of gear positions is formed by combination of a plurality of planetary gear mechanisms and an engagement device (brake and clutch) or may be a so-called general stepped automatic transmission, for example. In a case of the continuously variable transmission, the transmission 20 may be a belt type or a ball planetary type, for example. Input and output shafts of the transmission 20 serve as the first and second power transmission elements regardless of its configuration.

Although the hybrid vehicles 100 and 101 which charge by regeneration operation utilizing the power of the engine ENG and the like are described as an example in the above-described embodiment and first and second variations, the technology described in the embodiment and the first and second variations may also be applied to a plug-in hybrid vehicle capable of being charged by an external power source.

REFERENCE SIGNS LIST 1-1, 1-2 HYBRID SYSTEM
11 ENGINE ROTARY SHAFT
12 MG1 ROTARY SHAFT
13 MG2 ROTARY SHAFT
20 TRANSMISSION
21 ROTARY SHAFT
30 DIFFERENTIAL DEVICE
40 TRANSMISSION CONTROL DEVICE
100, 101 HYBRID VEHICLE
90 HVECU (INTEGRATED ECU)
91 ENGINE ECU
92 MGECU
BK1 BRAKE
CL1 CLUTCH
C1, C2 CARRIER
ENG ENGINE (ENGINE)
MG1 FIRST ROTARY MACHINE
MG2 SECOND ROTARY MACHINE
P1, P2 PINION GEAR
R1, R2 RING GEAR
S1, S2 SUN GEAR
W DRIVEN WHEEL

The invention claimed is:

1. A power transmission device of a hybrid vehicle, comprising:
a transmission including a planetary mechanism including a plurality of transmission rotational elements configured to perform differential rotation, one of the transmission rotational elements being connected to a rotary shaft of an engine;
a differential device including a plurality of differential rotational elements configured to perform differential rotation, the differential rotational elements including:
a differential rotational element connected to one of the transmission rotational elements of the transmission;
a differential rotational element connected to a rotary shaft of a first rotary machine; and
a differential rotational element connected to a rotary shaft of a second rotary machine and a driven wheel;
a transmission control device configured to control the transmission into a neutral state in which power is not able to be transmitted between an input and an output of the transmission or into a state in which the power is able to be transmitted between the input and the output; and a control device configured to control the first rotary machine such that pinion differential rotation of the transmission or the differential device is set to be not higher than a predetermined value at a time unique motor EV driving is performed only by power of the second rotary machine, wherein the control device is configured to increase an absolute value of a rotation rate of the first rotary machine at a time the transmission is in the neutral state.

2. The power transmission device of the hybrid vehicle according to claim 1, wherein the control device is configured to execute the control of the first rotary machine at a time a vehicle speed becomes higher than a predetermined vehicle speed during the unique motor EV driving.

3. The power transmission device of the hybrid vehicle according to claim 2, wherein the control device is configured to control the transmission control device such that the transmission is put into the state capable of transmitting the power at a time the vehicle speed becomes further higher than the predetermined vehicle speed.

4. A power transmission device of a hybrid vehicle, comprising:

a transmission including a planetary mechanism including a plurality of transmission rotational elements configured to perform differential rotation, one of the transmission rotational elements being connected to a rotary shaft of an engine;

a differential device including a plurality of differential rotational elements configured to perform differential rotation, the differential rotational elements including:
 a differential rotational element connected to one of the transmission rotational elements of the transmission;
 a differential rotational element connected to a rotary shaft of a first rotary machine; and
 a differential rotational element connected to a rotary shaft of a second rotary machine and a driven wheel;

a transmission control device configured to control the transmission into a neutral state in which power is not able to be transmitted between an input and an output of the transmission or into a state in which the power is able to be transmitted between the input and the output; and a control device configured to control the first rotary machine such that pinion differential rotation of the transmission or the differential device is set to be not higher than a predetermined value at a time unique motor EV driving is performed only by power of the second rotary machine, wherein the control device is configured to decrease an absolute value of a rotation rate of the first rotary machine at a time a vehicle speed becomes higher than a predetermined vehicle speed during the unique motor EV driving or during both motor EV driving by the power of the first rotary machine and the power of the second rotary machine.

5. The power transmission device of the hybrid vehicle according to claim 4, wherein the control device is configured to execute the control of the first rotary machine after switching to the unique motor EV driving at a time the vehicle speed becomes higher than the predetermined vehicle speed during the both motor EV driving.

6. A power transmission device of a hybrid vehicle, comprising:

a differential device including a plurality of differential rotational elements configured to perform differential rotation including:
 a differential rotational element connected to a rotary shaft of an engine; and
 a differential rotational element connected to a rotary shaft of a first rotary machine;

a transmission including a plurality of transmission rotational elements configured to perform differential rotation, the transmission rotational elements including:
 a transmission rotational element connected to one of the differential rotational elements in the differential device; and
 a transmission rotational element to which a rotary shaft of a second rotary machine and a driven wheel are connected;

a transmission control device configured to control the transmission into a neutral state in which power is not able to be transmitted between an input and an output of the transmission or into a state in which the power is able to be transmitted between the input and the output; and a control device configured to control the first rotary machine such that pinion differential rotation of the transmission or the differential device is set to be not higher than a predetermined value at a time unique motor EV driving is performed only by power of the second rotary machine, wherein the control device is configured to increase an absolute value of a rotation rate of the first rotary machine at a time the transmission is in the neutral state.

7. A hybrid system comprising:

an engine;

a first rotary machine;

a second rotary machine;

a transmission including a planetary mechanism including a plurality of transmission rotational elements configured to perform differential rotation with a rotary shaft of the engine connected to one of the transmission rotational elements;

a differential device including a plurality of differential rotational elements configured to perform differential rotation, the differential rotational elements including:
 a differential rotational element connected to one of the transmission rotational elements of the transmission;
 a differential rotational element connected to a rotary shaft of the first rotary machine; and
 a differential rotational element connected to a rotary shaft of the second rotary machine and a driven wheel;

a transmission control device configured to control the transmission into a neutral state in which power is not able to be transmitted between an input and an output of the transmission or into a state in which the power is able to be transmitted between the input and the output; and a control device configured to control the first rotary machine such that pinion differential rotation of the transmission or the differential device is set to be not higher than a predetermined value at a time unique motor EV driving is performed only by power of the second rotary machine, wherein the control device is configured to increase an absolute value of a rotation rate of the first rotary machine at a time the transmission is in the neutral state.

8. A hybrid system comprising:
an engine;
a first rotary machine,
a second rotary machine;
a transmission including a planetary mechanism including a plurality of transmission rotational elements configured to perform differential rotation with a rotary shaft of the engine connected to one of the transmission rotational elements;
a differential device including a plurality of differential rotational elements configured to perform differential rotation, the differential rotational elements including:
a differential rotational element connected to one of the transmission rotational elements of the transmission;
a differential rotational element connected to a rotary shaft of the first rotary machine; and
a differential rotational element connected to a rotary shaft of the second rotary machine and a driven wheel;
a transmission control device configured to control the transmission into a neutral state in which power is not able to be transmitted between an input and an output of the transmission or into a state in which the power is able to be transmitted between the input and the output; and
a control device configured to control the first rotary machine such that pinion differential rotation of the transmission or the differential device is set to be not higher than a predetermined value at a time unique motor EV driving is performed only by power of the second rotary machine,
wherein the control device is configured to decrease an absolute value of a rotation rate of the first rotary machine at a time a vehicle speed becomes higher than a predetermined vehicle speed during the unique motor EV driving or during both motor EV driving by power of the first rotary machine and the power of the second rotary machine.

9. A power transmission device of a hybrid vehicle, comprising:
a differential device including a plurality of differential rotational elements configured to perform differential rotation including:
a differential rotational element connected to a rotary shaft of an engine; and
a differential rotational element connected to a rotary shaft of a first rotary machine;
a transmission including a plurality of transmission rotational elements configured to perform differential rotation, the transmission rotational elements including:
a transmission rotational element connected to one of the differential rotational elements in the differential device; and
a transmission rotational element to which a rotary shaft of a second rotary machine and a driven wheel are connected;
a transmission control device configured to control the transmission into a neutral state in which power is not able to be transmitted between an input and an output of the transmission or into a state in which the power is able to be transmitted between the input and the output; and
a control device configured to control the first rotary machine such that pinion differential rotation of the transmission or the differential device is set to be not higher than a predetermined value at a time unique motor EV driving is performed only by power of the second rotary machine,
wherein the control device is configured to decrease an absolute value of a rotation rate of the first rotary machine at a time a vehicle speed becomes higher than a predetermined vehicle speed during the unique motor EV driving or during both motor EV driving by the power of the first rotary machine and the power of the second rotary machine.

* * * * *